US008694250B2

(12) United States Patent
Talbot et al.

(10) Patent No.: US 8,694,250 B2
(45) Date of Patent: Apr. 8, 2014

(54) PROCESSING MULTI-GNSS DATA FROM MIXED-TYPE RECEIVERS

(75) Inventors: Nicholas Talbot, Ashburton (AU); Ulrich Vollath, Ismaning (DE); Gang Lu, Cupertino, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 1336 days.

(21) Appl. No.: 12/319,623

(22) Filed: Jan. 8, 2009

(65) Prior Publication Data

US 2009/0184869 A1 Jul. 23, 2009

Related U.S. Application Data

(60) Provisional application No. 61/010,601, filed on Jan. 9, 2008.

(51) Int. Cl.
*G01S 1/00* (2006.01)
(52) U.S. Cl.
USPC .......................................................... 701/477
(58) Field of Classification Search
USPC ......... 701/400, 468, 469, 470, 471, 473, 478, 701/478.5, 518, 300, 541, 477
See application file for complete search history.

(56) References Cited

U.S. PATENT DOCUMENTS

| | | | | |
|---|---|---|---|---|
| 5,991,691 A * | 11/1999 | Johnson | | 701/470 |
| 7,312,747 B2 | 12/2007 | Vollath et al. | | |
| 7,432,853 B2 | 10/2008 | Vollath | | |
| 2005/0101248 A1 * | 5/2005 | Vollath | | 455/12.1 |
| 2005/0151683 A1 * | 7/2005 | Sharpe et al. | | 342/357.04 |
| 2008/0165054 A1 | 7/2008 | Vollath et al. | | |
| 2008/0165055 A1 | 7/2008 | Vollath et al. | | |
| 2010/0117884 A1 * | 5/2010 | Ahmed et al. | | 342/14 |
| 2010/0225532 A1 * | 9/2010 | France et al. | | 342/357.23 |

OTHER PUBLICATIONS

H. Habrich et al., *Double difference ambiguity resolution for GLONASS/GPS carrier phase*, 12th Int. Tech. Meeting of the Satellite Division of the U.S. Inst. of Navigation GPS ION '99, Nashville, Tennessee, Sep. 14-17, 1999, pp. 1609-1618.

(Continued)

*Primary Examiner* — Behrang Badii
*Assistant Examiner* — Daniel L Greene
(74) *Attorney, Agent, or Firm* — Bruce D Riter

(57) ABSTRACT

Computer-implemented methods and apparatus are presented for processing data collected by at least two receivers from multiple satellites of multiple Global Navigation Satellite Systems (GNSS), where at least one GNSS is Frequency Division Multiple Access (FDMA). Data sets are obtained which comprise a first data set from a first receiver and a second data set from a second receiver. The first data set comprises a first FDMA data set and the second data set comprises a second FDMA data set. At least one of a code bias and a phase bias may exist between the first FDMA data set and the second FDMA data set. At least one receiver-type bias is determined, to be applied when the data sets are obtained from receivers of different types. The data sets are processed, based on the at least one receiver-type bias, to estimate carrier floating-point ambiguities. Carrier integer ambiguities are determined from the floating-point ambiguities. The scheme enables Globalnaya Navigatsionnaya Sputnikovaya Sistema (GLONASS) carrier phase ambiguities to be resolved and used in a combined FDMA/Code Division Multiple Access (CDMA)(e.g., GLONASS/Global Positioning System (GPS) centimeter-level solution. It is applicable to real-time kinematic (RTK) positioning, high-precision post-processing of positions and network RTK positioning.

21 Claims, 16 Drawing Sheets

(56) References Cited

OTHER PUBLICATIONS

S. Han et al. *A New Data Processing Strategy for Combined GPS/GLONASS Carrier Phase-Based Positioning*, 12th Int. Tech. Meeting of the Satellite Division of the U.S. Inst. of Navigation GPS ION'99, Nashville, Tennessee, Sep. 14-17, 1999, pp. 1619-1627.

J. Wang et al., *GPS and GLONASS Integration: Modelling and Ambiguity Resolution Issues*, GPS Solutions, vol. 5, No. 1, Summer 2001, pp. 1-15.

R. Hatch, *The Synergism of GPS Code and Carrier Measurements*, Proc. Third International Symposium on Satellite Doppler Positioning, DMA, Las Cruces, NM, 1982, pp. 1213-1232.

P. Misra et al, Global Positioning System, Signals, Measurements, and Performance, Ganga-Jamuna Press, Lincoln, MA, ISBN: 0-9709544-0-9, 2001, pp. 157-160.

N. Talbot, "*Compact Data Transmission Standard for High-Precision GPS*", Proceedings of the 9th International Technical Meeting of the Satellite Division of the Institute of Navigation ION GPS 1996, Sep. 17-20, 1996, Kansas City, MO, pp. 861-871.

R. Walpole et al., Probability and Statistics for Engineers and Scientists, Macmillan Publishing, New York, NY, ISBN: 0-02-979870-1, 1978, pp. 249-253.

S. Verhagen, The GNSS Integer Ambiguities: Estimation and Validation, PhD Thesis, Delft Institute of Earth Observation and Space Systems, Delft Institute of Technology, 2004, 181 pages.

J. Wang et al., *A discrimination test procedure for ambiguity resolution on-the-fly*, Journal of Geodesy, vol. 72, 1998, pp. 644-653.

P. Teunissen et al., *On the foundation of the popular ratio test for GNSS ambiguity resolution*, ION-GNSS-2004, Long Beach, CA, 12 pp.

P. Teunissen, *Integer aperture bootstrapping: a new GNSS ambiguity estimator with controllable failrate*, Journal of Geodesy, Springer, Jul. 25, 2005, vol. 79, No. 6, pp. 9 pages.

I. Artushkin et al., *ATOM: Super Compact an Flexible Format to Store and Transmit GNSS Data*, ION GNSS Sep. 16-19, 2008, Savannah, Georgia, 8 pp.

A. Boriskin et al., *Algorithms to Calibrate and Compensate for GLONASS Biases in GNSS RTK Receivers working with $3^{rd}$ party Networks*, ION GNSS Sep. 16-19, 2008, 9 pp.

RTCM Paper 091-2007-SC104-476, Amendment 2 (Draft) to RTCM Recommended Standards for Differntial GNSS (Global Navigation Satellite Systems) Services—Version 3, May 11, 2007, 18 pp.

D. Kozlov et al., Statistical Characterization of Hardware Biases in GPS+GLONASS Receivers, ION GPS 2000, Sep. 19-22, 2000, Salt Lake City, UT, pp. 817-826.

\* cited by examiner

PROCESSING MULTI-GNSS DATA FROM MIXED-TYPE RECEIVERS

CROSS REFERENCE TO RELATED APPLICATIONS

This application claims benefit of U.S. Provisional Application for Patent No. 61/010,601, filed Jan. 9, 2008, the content of which is incorporated herein by this reference.

The content of U.S. patent application: VOLLATH U., "Ambiguity Estimation of GNSS Signals for Three or more Carriers," application Ser. No.: 10/696,528 filed Oct. 28, 2003, Pub. No.: US 2005/0101248 A1 published May 12, 2005 is incorporated herein by this reference. The content of U.S. Pat. No. 7,312,747, VoLLATH U. and DOUCET K., "Multiple-GNSS and F DMA High-Precision Carrier-Phase Based Positioning," dated Dec. 25, 2007 is incorporated herein by this reference. application Ser. No. 11/983,926, filed Nov. 12, 1987 an published as US 2008/0165055 on Jul. 10, 2008 and application Ser. No. 11/983,925, filed Nov. 12, 1987 and Published as US 2008/0165054 on Jul. 10, 2008 are continuation of U.S. Pat. No. 7,312,747.

FIELD OF THE INVENTION

The present invention relates to the field of Global Navigation Satellite Systems (GNSS). More particularly, the present invention relates to processing of data collected by at least two receivers from multiple satellites of multiple GNSS where at least one GNSS is Frequency Division Multiple Access (FDMA) and there is at least one of a code bias and a carrier bias between FDMA data collected by receivers of different types.

BACKGROUND OF THE INVENTION

Global Navigation Satellite Systems (GNSS) include the Global Positioning System (GPS), the Globalnaya Navigatsionnaya Sputnikovaya Sistema (GLONASS) system, the proposed Galileo system, and the proposed Beidou system. Receivers from multiple manufacturers are now commercially available which can receive and process signals from satellites of multiple GNSS, such as GPS and GLONASS. Users are particularly interested in being able to mix and match reference and rover receiver hardware from different manufacturers. In many cases, a customer may not own the reference station being used to generate correction data, and may not know which receiver type is generating the available correction data. Receiver hardware of different types, e.g., from different manufacturers, may not be compatible.

Several authors have investigated the problems faced when performing GLONASS carrier phase ambiguity resolution, such as: Habrich, H., Beutler, G., Gurtner, W. & Rothacher, M. (1999) Double difference ambiguity resolution for GLO-NASS/GPS carrier phase. 12th Int. Tech. Meeting of the Satellite Division of the U.S. Inst. of Navigation GPS ION'99, Nashville, Tenn., 14-17 September, pp. 1609-1618; Han, S., Dai, L., & Rizos, C., (1999) A New Data Processing Strategy for Combined GPS/GLONASS Carrier Phase-Based Positioning, 12th Int. Tech. Meeting of the Satellite Division of the U.S. Inst. of Navigation GPS ION'99, Nashville, Tenn., 14-17 September, pp. 1619-1627; Wang, J., Rizoz, C., Stewart, M. P., & Leick, A., (2001) GPS and GLONASS Integration: Modelling and Ambiguity Resolution Issues, GPS Solutions, vol. 5. no. 1. Summer, pp. 55-64. These publications do not address the estimation of GLO-NASS code and/or carrier biases between data collected by receiver hardware of different types.

Improved methods and apparatus for processing GNSS signals are desired, particularly to enable compatibility between receivers of different types.

SUMMARY OF THE INVENTION

Improved methods and apparatus in accordance with some embodiments of the invention compensate for incompatibility between receivers of different types.

The signal structure implemented in GLONASS presents problems for Real-Time Kinematic (RTK) data processing as well as network data processing and data post-processing. Code and/or carrier measurements taken by GNSS receivers of different types, such as receivers from different manufacturers, have different inherent biases. These may result from different hardware and software tracking schemes. For measurements taken from satellites of a Code-Division, Multiple-Access (CDMA) GNSS such as GPS or Galileo, where each satellite of the GNSS transmits on the same nominal frequency/wavelength, these biases cancel when forming double-difference observations. Many receiver-related bias terms can be absorbed into a common clock term when processing these measurements. In contrast, with the Frequency-Division, Multiple Access (FDMA) approach of GLONASS, each GLONASS satellite transmits on a slightly different frequency/wavelength. When processing GLONASS measurement data, the differences in satellite wavelengths means that common receiver bias terms do not completely cancel when mixing data collected by receiver hardware of different types, e.g., from different manufacturers.

Computer-implemented methods and apparatus in accordance with embodiments of the invention provide for processing data collected by at least two receivers from multiple satellites of multiple GNSS, where at least one GNSS is FDMA. Data sets are obtained which comprise a first data set from a first receiver and a second data set from a second receiver. The first data set comprises a first FDMA data set and the second data set comprises a second FDMA data set. At least one of a code bias and a phase bias may exist between the first FDMA data set and the second FDMA data set. At least one receiver-type bias is determined, to be applied when the data sets are obtained from receivers of different types. The data sets are processed, based on the at least one receiver-type bias, to estimate carrier floating-point ambiguities. Carrier integer ambiguities are determined from the floating-point ambiguities. The scheme enables GLONASS carrier phase ambiguities to be resolved and used in a combined FDMA/CDMA (e.g., GLONASS/GPS) centimeter-level solution. It is applicable to real-time kinematic (RTK) positioning, high-precision post-processing of positions and network RTK positioning.

BRIEF DESCRIPTION OF THE DRAWINGS

These and other aspects and features of the present invention will be more readily understood from the embodiments described below with reference to the drawings, in which.

DETAILED DESCRIPTION

Overview

Figure 1:
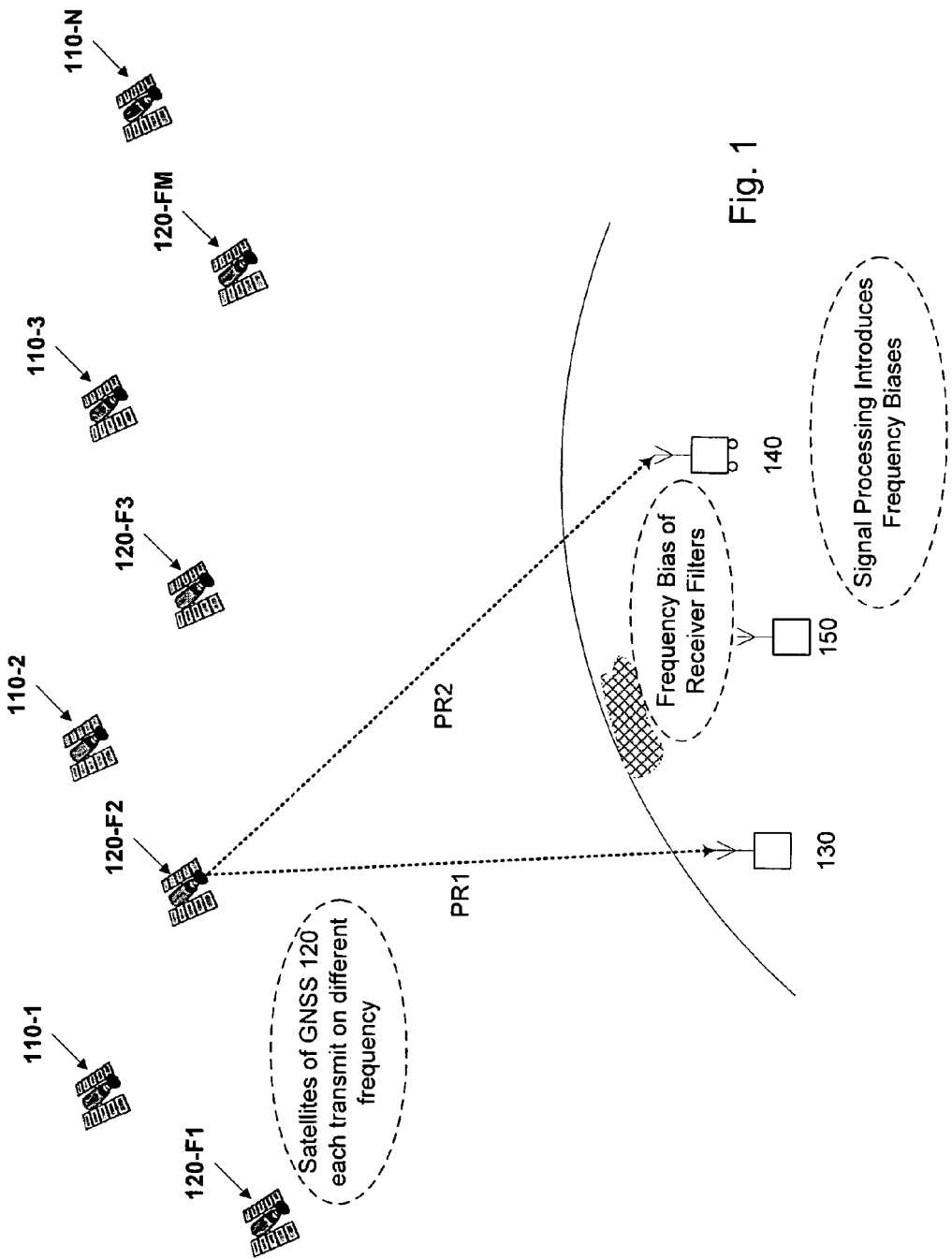
FIG. 1 schematically illustrates a scenario using two GNSS with receivers of different types having different frequency biases.

FIG. 1 schematically illustrates a scenario using two GNSS (110, 120) with receivers of different types having different frequency biases, such as a reference station 130 from a first manufacturer and a rover 140 from a second manufacturer. GNSS 110 is a CDMA system such as GPS. GNSS 120 is an FDMA system such as GLONASS. Reference station 130, rover 140, and one or more additional reference stations 150, if provided, each receive GNSS signals from any number of satellites of a first GNSS, such as satellites 110-1, 110-2, . . . , 110-N, and from any number of satellites of a second GNSS, such as satellites 120-F1, 120-F2, . . . , 120-FM. Respective pseudoranges, PR1, PR2, etc. from each satellite are to be determined from GNSS signal data collected at the receivers.

Pseudo-range can be determined for example using the GPS C/A code with an error of about one meter. A civil GPS receiver not using the military-only P/Y code determines rover position with an error in the range of meters. However, the phases of the L1 and L2 carriers can be measured with an accuracy of 0.01-0.05 cycles (corresponding to pseudo-range errors of 2 mm to 1 cm), allowing relative position of the rover to be estimated with errors in the range of millimeters to centimeters with appropriate estimation of carrier ambiguities.

Figure 2:
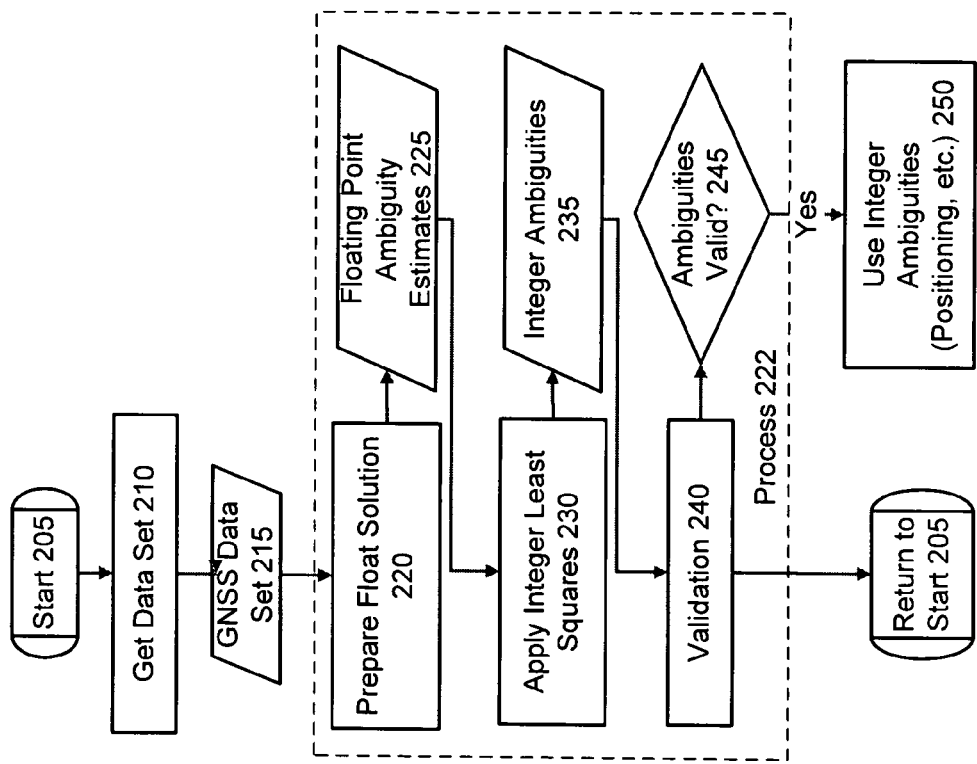
FIG. 2 is a high-level flow chart of typical prior-art GNSS processing schemes.

FIG. 2 is a high-level flow chart of typical prior-art GNSS processing schemes. The process starts at 205. At step 210 data is obtained, e.g., GNSS data 215 representing measurements taken at multiple receivers. The data is processed in a series of steps within a process 222. At step 220, a float solution 225 of floating point carrier ambiguity estimates is prepared, such as by applying a Kalman filter. At step 230, integer least squares is applied to the float solution to produce a set of carrier integer ambiguities 235. At step 240, integer ambiguities 235 are subjected to validation. At step 245, the validation result is examined to determine validity of the integer ambiguities. If determined to be valid, the integer ambiguities are used in a further process 250, such as determining position of a rover. The process repeats as needed.

Figure 3:
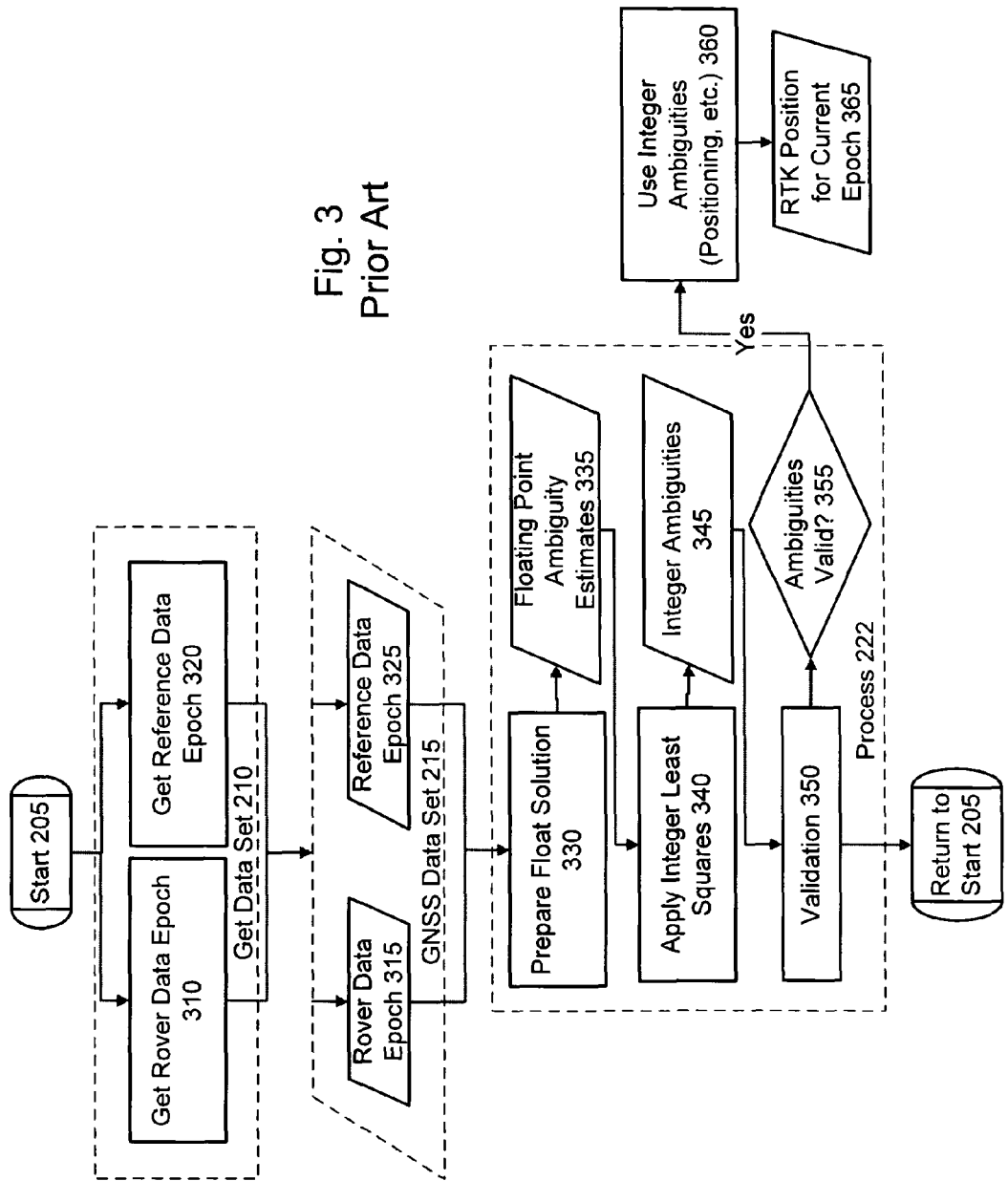
FIG. 3 is a more detailed view of the scheme of FIG. 2 showing features specific to a single-reference-station RTK scenario.

FIG. 3 is a more detailed view of the scheme of FIG. 2 showing features specific to a single-reference-station RTK scenario. At step 310 an epoch of rover data 315 is obtained and at step 320 an epoch of reference data 325 is obtained. At step 330, a float solution 335 of floating point carrier ambiguity estimates is prepared, such as by applying a Kalman filter. For RTK processing with a single reference station, the Kalman filter typically operates on single-differenced rover and reference data. At step 340, integer least squares is applied to the float solution to produce a set of carrier integer ambiguities 345. At step 350, integer ambiguities are subjected to validation. At step 355, the validation result is examined to determine validity of the integer ambiguities. If determined to be valid, the integer ambiguities are used in a further process 360, such as for determining position of the rover. The process repeats for subsequent epochs.

Figure 4:
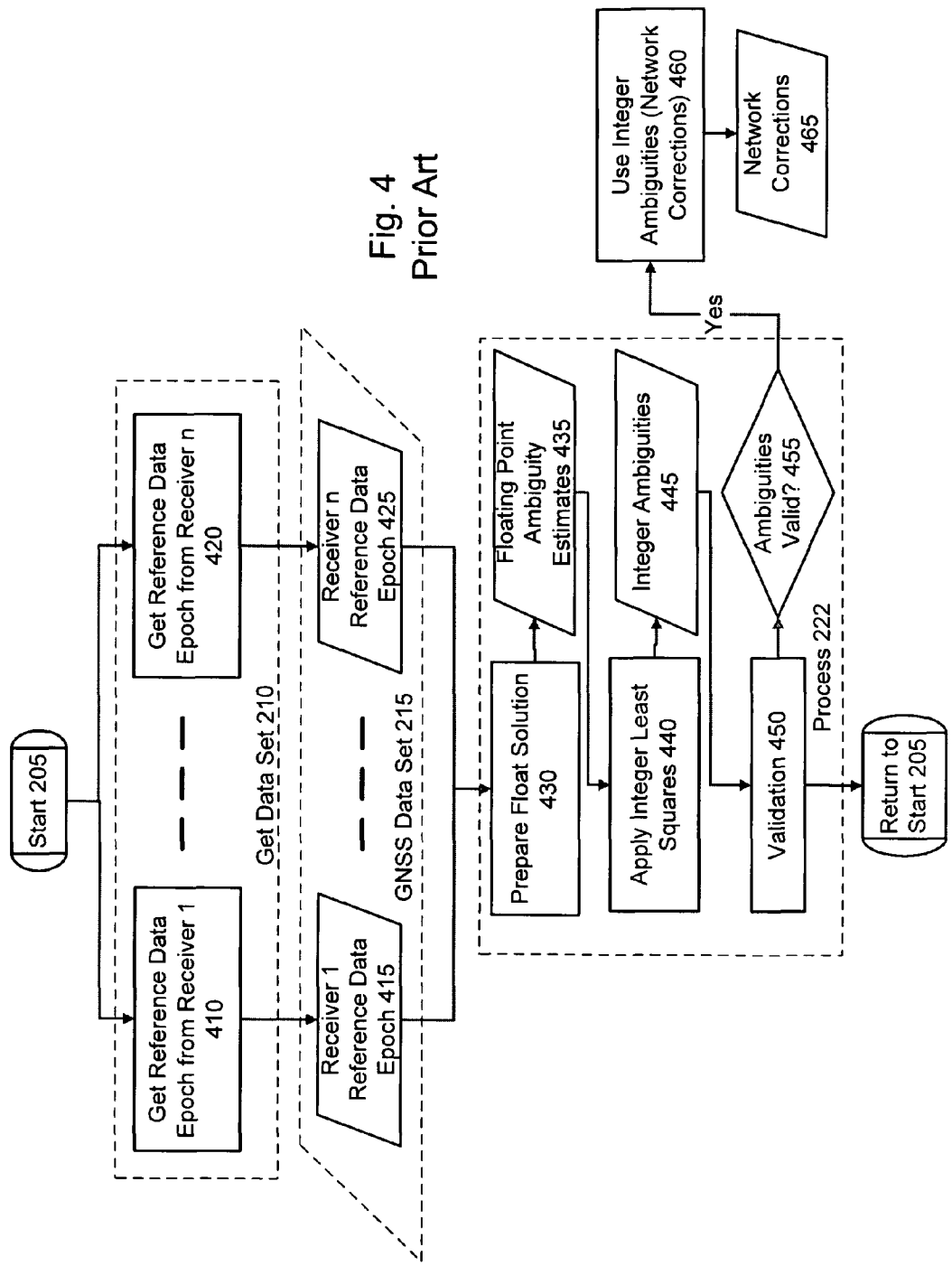
FIG. 4 is a more detailed view of the scheme of FIG. 2 showing features specific to network RTK scenarios.

FIG. 4 is a more detailed view of the scheme of FIG. 2 showing features specific to network RTK scenarios. At step 410 an epoch of reference data 415 is obtained from a first reference receiver and at step 420 an epoch of reference data 425 is obtained from a n-th reference receiver. GNSS data set 215 in this scenario comprises an epoch of data from each of multiple network reference stations 1, . . . , n. At step 430, a float solution 435 of floating point carrier ambiguity estimates is prepared, such as by applying a Kalman filter. For network processing with multiple reference stations, the Kalman filter typically operates on the data without differencing between receivers. At step 440, integer least squares is applied to the float solution to produce a set of carrier integer ambiguities 445. At step 450, integer ambiguities are subjected to validation. At step 455, the validation result is examined to determine validity of the integer ambiguities. If determined to be valid, the integer ambiguities are used in a further process 460, such as for preparing network corrections 465 to be transmitted for use by one or more rovers. The process repeats for subsequent epochs.

Figure 5:
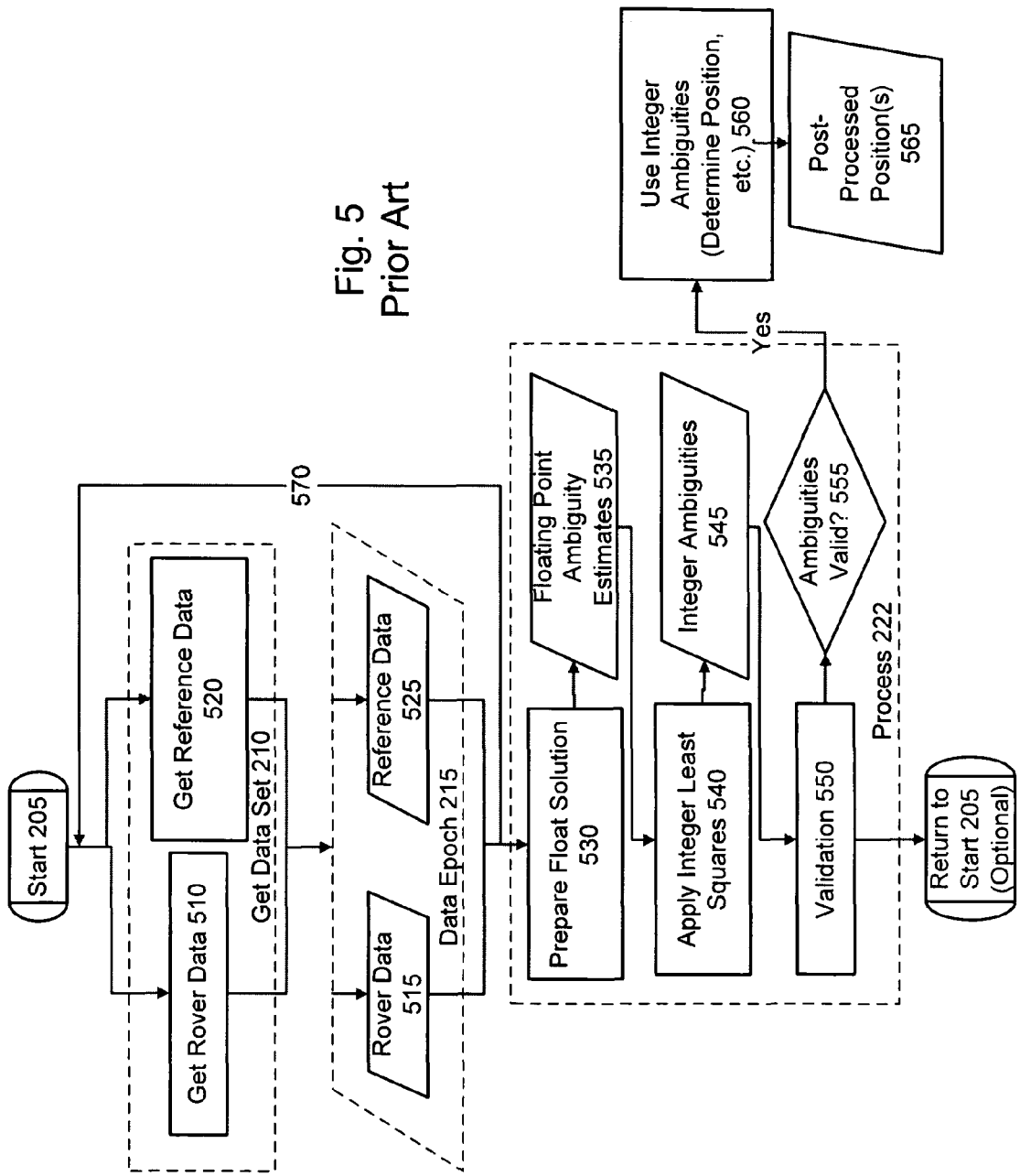
FIG. 5 is a more detailed view of the scheme of FIG. 2 showing features specific to post-processing (not real-time) scenarios.

FIG. 5 is a more detailed view of the scheme of FIG. 2 showing features specific to post-processing (not real-time) scenarios. At step 510 a set of rover data 515 is obtained, e.g., from storage in rover memory. At step 520 a set of reference data 525 from one or more reference receivers is obtained, e.g., from storage at a server. GNSS data set 215 in this scenario comprises multiple epochs of data from the rover and multiple epochs of data from the reference station or stations. At step 530, a float solution 535 of floating point carrier ambiguity estimates is prepared, such as by applying a Kalman filter. For post-processing, the Kalman filter typically operates on the rover data and reference data covering multiple epochs at once, rather than processing epoch by epoch as for real-time solutions. At step 540, integer least squares is applied to the float solution to produce a set of carrier integer ambiguities 545. At step 550, integer ambiguities are subjected to validation. At step 555, the validation result is examined to determine validity of the integer ambiguities. If determined to be valid, the integer ambiguities are used in a further process 560, such as for determining rover positions. The process optionally repeats for further data sets.

Combined processing of signal data from more than one GNSS, such as combined GPS+GLONASS RTK processing, raises some special issues, as described in U.S. Pat. No. 7,312,747. These include multiple sources of frequency-dependent error, including: satellites of FDMA GNSS 120 each transmit on a different frequency; receiver filter hardware introduces frequency-dependent biases; and signal processing introduces frequency-dependent biases.

GLONASS Code Bias and/or Carrier Bias

A further issue arises when the receivers are of different types, e.g., from different manufacturers. Antenna and receiver electronics contain filters and components that introduce delays in code and carrier observations which in general vary according to the signal frequency. Some components also display some varying response with temperature, although this tends to be small for modern equipment. Receiver manufacturers aim for consistency between GNSS measurements in their own equipment, but differences can arise when mixing data from receivers of different types e.g., receivers of different manufacturers. Another reason for incompatibility may arise from possible differences in the way the physical measurements are converted into actual measurements presented to the subsequent processing. In this context, the GLONASS code bias and phase bias seem to be handled very differently in receivers of one manufacturer as compared to receivers of other manufacturers.

GLONASS Observation Models

The following undifferenced observation equation can be used to describe GNSS carrier phase data for a single receiver to a single satellite:

$$\lambda^s \phi^s = \rho^s - T^s + \tau + \beta^s + \lambda^s n^s \quad (1)$$

Where:
$\lambda^s$ nominal carrier phase wavelength for satellite s,
$\phi^s$ carrier phase observation for a single receiver for satellite s
$\rho^s$ geometric range from receiver to satellite s which also contains atmospheric and other bias errors not explicitly of concern to the problem at hand,
$T^s$ clock error term for satellite s,
$\tau$ receiver clock bias term,
$\beta^s$ receiver carrier bias term for satellite s,
$n^s$ integer ambiguity term for satellite s.

Code observations provide unambiguous estimates of the receiver-satellite range. The simplified undifferenced (single receivers) GNSS code observation model can be written:

$$R^r = \rho^r - T^r + \tau + B^r \quad (2)$$

Where:
$R^r$ code observation from receiver to satellite r,
$\rho^r$ geometric-range term for satellite r,
$T^r$ clock error term for satellite r,
$\tau$ receiver clock error,
$B^r$ receiver hardware code bias for satellite r.

Of particular interest in (2) is the receiver hardware code bias term $B^r$. The receiver hardware code bias term is virtually identical for all GPS satellite observations which are broadcast at the same nominal frequency. The receiver hardware code bias term for GLONASS satellites is normally different than the hardware code bias term for GPS satellites. Even though each visible GLONASS satellite broadcast on slightly different frequencies, the code bias terms for each satellite have been shown to be relatively stable for a particular receiver type. That is, $B^1 \approx B^2 \approx B^r$, hence we can replace $B^r$ by $B_{GLN}$ for GLONASS satellites. The GPS receiver hardware code bias term is given by $B_{GPS}$ but can be assumed to be zero for convenience.

GNSS satellites broadcast correction models for each satellite clock. That is, GPS satellites broadcast a correction with respect to the GPS time scale; GLONASS satellites provide a correction model with respect to GLONASS time. Hence $T^s$ is known for each satellite, however the relationship between $T^s$ for GLONASS satellites and the GPS timescale is not directly provided by the satellites themselves.

The variable offset between GPS and GLONASS system times is monitored by various timekeeping organizations around the world such as the Bureau International des Poids and Measures (BIPM). The BIPM publish results of GPS and GLONASS system times on the Internet. Both GPS and GLONASS system times are based on atomic frequency standards and therefore are relatively stable in absolute sense as well as being relatively stable. A single-receiver navigation solution can be used as part of a scheme to estimate the receiver hardware code bias term for GLONASS satellites. The following state description is suitable for processing GNSS data including say GPS and GLONASS satellites:

$$\begin{bmatrix} x \\ y \\ z \\ t_{GPS} \\ t_{GLN} - t_{GPS} \end{bmatrix} = \begin{bmatrix} x \\ y \\ z \\ (\tau + B_{GPS}) \\ (\tau + B_{GLN} - T_{GLN}) - (\tau + B_{GPS}) \end{bmatrix} \quad (3)$$

Where:
x, y, z receiver location in term of Cartesian coordinates in an Earth-Centered, Earth-Fixed system,
$t_{GPS}$ modified receiver clock term that includes any GPS receiver hardware code bias,
$t_{GLN}$ modified receiver clock term that includes any GLONASS receiver hardware code bias,
$\tau$ receiver clock offset term with respect to the GPS timescale,
$B_{GPS}$ receiver hardware code bias term for GPS satellites,
$B_{GLN}$ receiver hardware code bias term for GLONASS satellites,
$T_{GLN}$ offset of the GLONASS timescale with respect to the GPS timescale.

Note that (3) is presented for the case where the receiver samples GPS and GLONASS data at the same instant and that computations are performed with respect to the GPS timescale.

If the GPS receiver hardware code bias term is set equal to zero, (3) becomes:

$$\begin{bmatrix} x \\ y \\ z \\ \tau \\ (B_{GLN} - T_{GLN}) \end{bmatrix} \quad (4)$$

The last parameter in the state vector presented in (4) is the difference between the receiver hardware code bias for GLONASS satellites, less the difference between GLONASS and GPS system time.

Receiver clock terms disappear in the double-difference model. Carrier phase bias terms $\Delta\beta^s$ and $\Delta\beta^r$ are equal when the satellite frequencies are identical (for the GPS case), but will differ slightly for the GLONASS case where the signal of each satellite has a slightly different frequency.

If $(B_{GLN} - T_{GLN})$ terms are computed for two receivers then it is possible to obtain the difference in the GLONASS receiver hardware code biases between the two receivers. That is, for receiver A: $(_A B_{GLN} - T_{GLN})$, and for receiver B: $(_B B_{GLN} - T_{GLN})$, then the difference in receiver hardware code biases is given by: $(_A B_{GLN} - T_{GLN}) - (_B B_{GLN} - T_{GLN})$.

The following simplified single-difference (between receivers) observation equation can be used to describe GNSS carrier phase data:

$$\lambda^s \Delta\phi^s = \Delta\rho^s + \Delta\tau + \Delta\beta^s + \lambda^s \Delta n^s \quad (5)$$

Where:
$\lambda^s$ nominal carrier phase wavelength, for satellite s,
$\Delta\phi^s$ single-difference carrier phase observation for satellite s,
$\Delta\rho^s$ single-difference geometric range to satellite s which also contains satellite clock, atmospheric and other bias errors not explicitly of concern to the problem at hand,
$\Delta\tau$ single-difference receiver clock bias term,
$\Delta\beta^s$ single-difference receiver carrier bias term for satellite s,
$\Delta n^s$ single-difference integer ambiguity term for satellite s.

There are many satellite, baseline and receiver bias terms which are greatly removed by double-differencing GNSS observations. The simplified double-difference (between satellites s and r) carrier phase model has the following form:

$$(\lambda^s \Delta\phi^s - \lambda^r \Delta\phi^r) = (\Delta\rho^s - \Delta\rho^r) + (\Delta\beta^s - \Delta\beta^r) + (\lambda^s \Delta n^s - \lambda^r \Delta n^r) \quad (6)$$

Receiver clock terms disappear in the double-difference model. Carrier phase bias terms $\Delta\beta^s$ and $\Delta\beta^r$ are equal when the satellite frequencies are identical (for the GPS case), but will differ slightly for the GLONASS case where the signal of each satellite has a slightly different frequency.

The ambiguity term on the right-hand side of (6) can be reformulated according to:

$$(\lambda^s \Delta n^s - \lambda^r \Delta n^r) = \lambda^s (\Delta n^s - \Delta n^r) + (\lambda^s - \lambda^r) \Delta n^r \quad (7)$$

The term $(\Delta n^s - \Delta n^r)$ is the difference of two integer quantities and therefore is also an integer. This corresponds to the double-difference ambiguities as the data has already been defined as single differences between rover and reference. The second term on the right-hand side of (7) corresponds to the ambiguity of the reference satellite $(\Delta n^r)$. This term is scaled by the difference in wavelength between the remote and reference satellites. For the GPS case $\lambda^s = \lambda^r$ and therefore the reference ambiguity term cancels. For the GLONASS case, $\lambda^s \neq \lambda^r$ and any error in the single-difference reference ambiguity term contributes an error into the left-hand side of (7).

Code observations offer a means of estimating the carrier phase ambiguity terms. The simplified single-difference (between receivers) GNSS code observation model can be written:

$$\Delta R^r = \Delta\rho^r + \Delta\tau + \Delta B^r \quad (8)$$

Where:
$\Delta R^r$ single-difference code observation to satellite r,
$\Delta\rho^r$ single-difference geometric-range term for satellite r,
$\Delta\tau$ single-difference receiver clock error, $\alpha B^r$ single-difference hardware code bias for satellite r.

Satellite ambiguities can be obtained by combining code and carrier observations from (8) and (5) respectively:

$$\Delta R^r - \Delta B^r = \lambda^r \Delta\phi^r - \Delta\beta^r - \lambda^r \Delta n^r \quad (9)$$

Hence:

$$\Delta n^r = (\lambda^r \Delta\phi^r - \Delta R^r + \Delta B^r - \Delta\beta^r)/\lambda^r \quad (10)$$

Code-carrier filtering is used to improve the estimates of the ambiguity $\Delta n^r$. A suitable single-difference code-carrier filter state description includes for example a single-difference ambiguity parameter $(\Delta n^r)$ for each satellite. A more rigorous modeling scheme can include an ambiguity term plus a code multipath state parameter. Code-carrier filtering can be implemented in terms of a simple average calculation, a Kalman filter, or a least-squares estimator. In any case, the aim of the code-carrier filter is to reduce the impact of code noise on the estimates of single-difference carrier phase ambiguities. (Details of code-carrier filtering techniques can be found in Hatch, R., 1982, The Synergism of GPS Code and Carrier Measurements, Proc. Third International Symposium on Satellite Doppler Positioning, DMA, Las Cruces, N. Mex., pp 1213-1232; and Misra, P., and Enge, P., 2001, Global Positioning System, Signals, Measurements, and Performance, Ganga-Jamuna Press, Lincoln, Mass., ISBN: 0-9709544-0-9, pp. 157-160)

So long as code and carrier combinations are selected for filtering such that they have identical ionospheric biases, then the predominant corrupting influence on the estimated ambiguity $\Delta n^r$ is due to code-multipath.

Note that the difference between the code and carrier hardware biases $(\Delta B^r - \Delta\beta^r)$ still remains in estimates of carrier phase ambiguities in (10).

Figure 6:
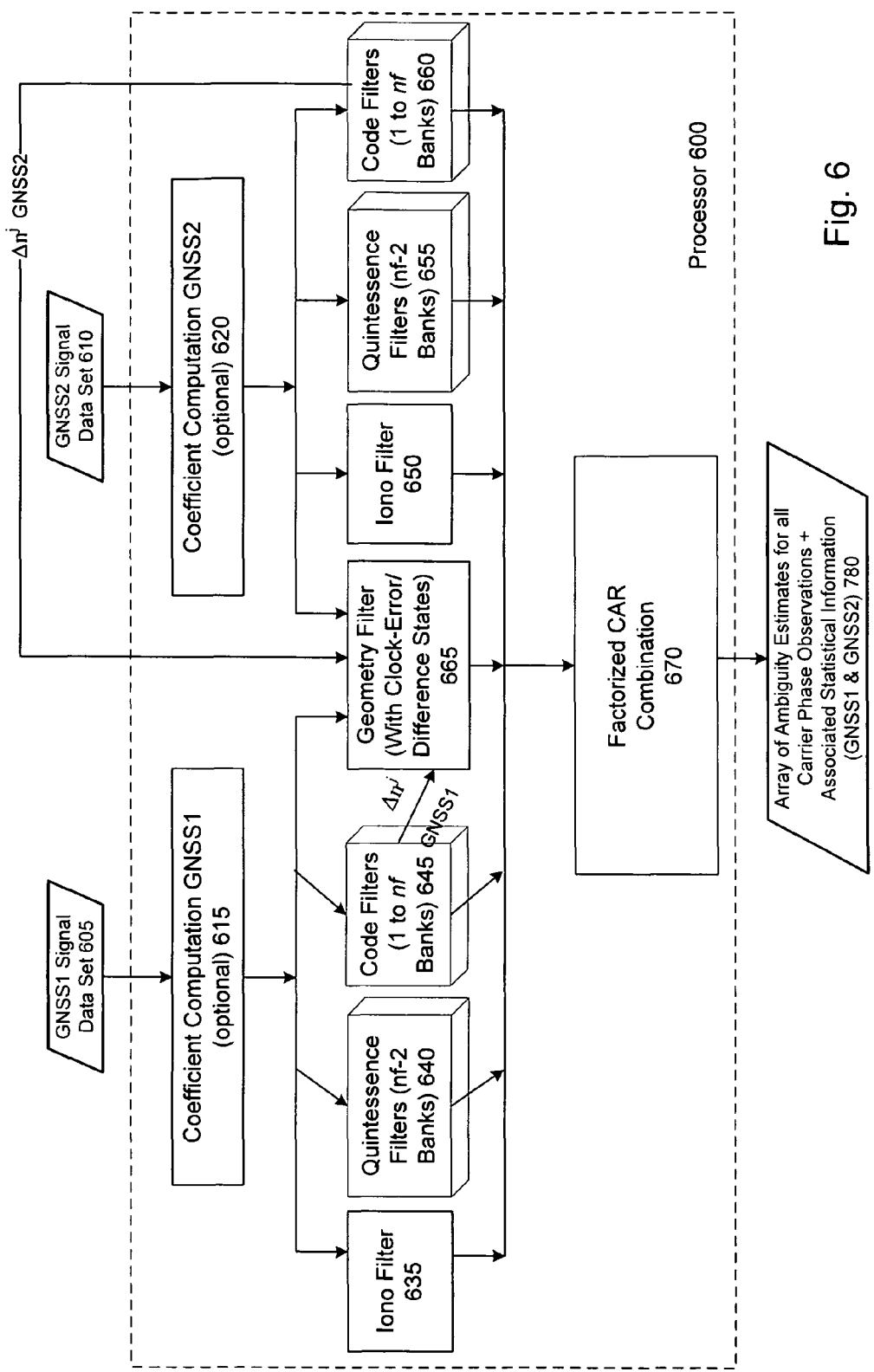
FIG. 6 is a block diagram of an apparatus for processing multi-GNSS with factorized carrier-ambiguity-resolution filters in accordance with embodiments of the invention.

FIG. 6 is a block diagram of an apparatus for processing multi-GNSS with factorized carrier-ambiguity-resolution filters in accordance with embodiments of the invention. The filters and their processing are substantially as described in U.S. Pat. No. 7,312,747 B2 and US 2005/0101248A1. A GNSS signal data set 605 from a first GNSS (e.g., FDMA, GLONASS) having two or more carrier frequencies is obtained from one or more GNSS receivers. A GNSS signal data set 610 from a second GNSS (e.g., CDMA, GPS/GALILEO) having two or more carrier frequencies is obtained from one or more GNSS receivers. An optional coefficient computation element 615 computes coefficients for the filters of the first GNSS. An optional coefficient computation element 620 computes coefficients for the filters of the second GNSS.

GNSS data set 605 and coefficients from element 615, if provided, are supplied to a geometry-free ionosphere filter 635, to one or more banks 640 of Quintessence filters having one filter per tracked satellite of the first GNSS, and to one to nf banks of code filters 645. The number of Quintessence filter banks 640 is two less than the number of carrier frequencies of the first GNSS; that is, the Quintessence filter banks are not needed if the first GNSS has only two carrier frequencies. GNSS data set 610 and coefficients from element 620, if provided, are supplied to a geometry-free ionosphere filter 650, to one or more banks 655 of Quintessence filters having one filter per tracked satellite of the second GNSS, and to one to nf banks of code filters 660. The number of Quintessence filter banks 655 is two less than the number of carrier frequencies of the second GNSS; that is, the Quintessence filter banks are not needed if the second GNSS has only two carrier frequencies. The structure and operation of the Quintessence filters is detailed in US 2005/0101248A1. Arrays produced by the filters are supplied to a combiner 670 which provides a combined array 780 of ambiguity estimates for all carrier phase observations with associated statistical information. Array 780 is useful, e.g., for precise position determination and in preparing network corrections.

In the embodiment of FIG. 6, a single geometry filter 665 is common to the first GNSS and second GNSS as they determine the same antenna position. That is, GNSS data set 605 and coefficients from element 615, if provided, are supplied to geometry filter 665, and GNSS data set 610 and coefficients from element 620, if provided, are supplied to geometry filter 665.

Figure 7:
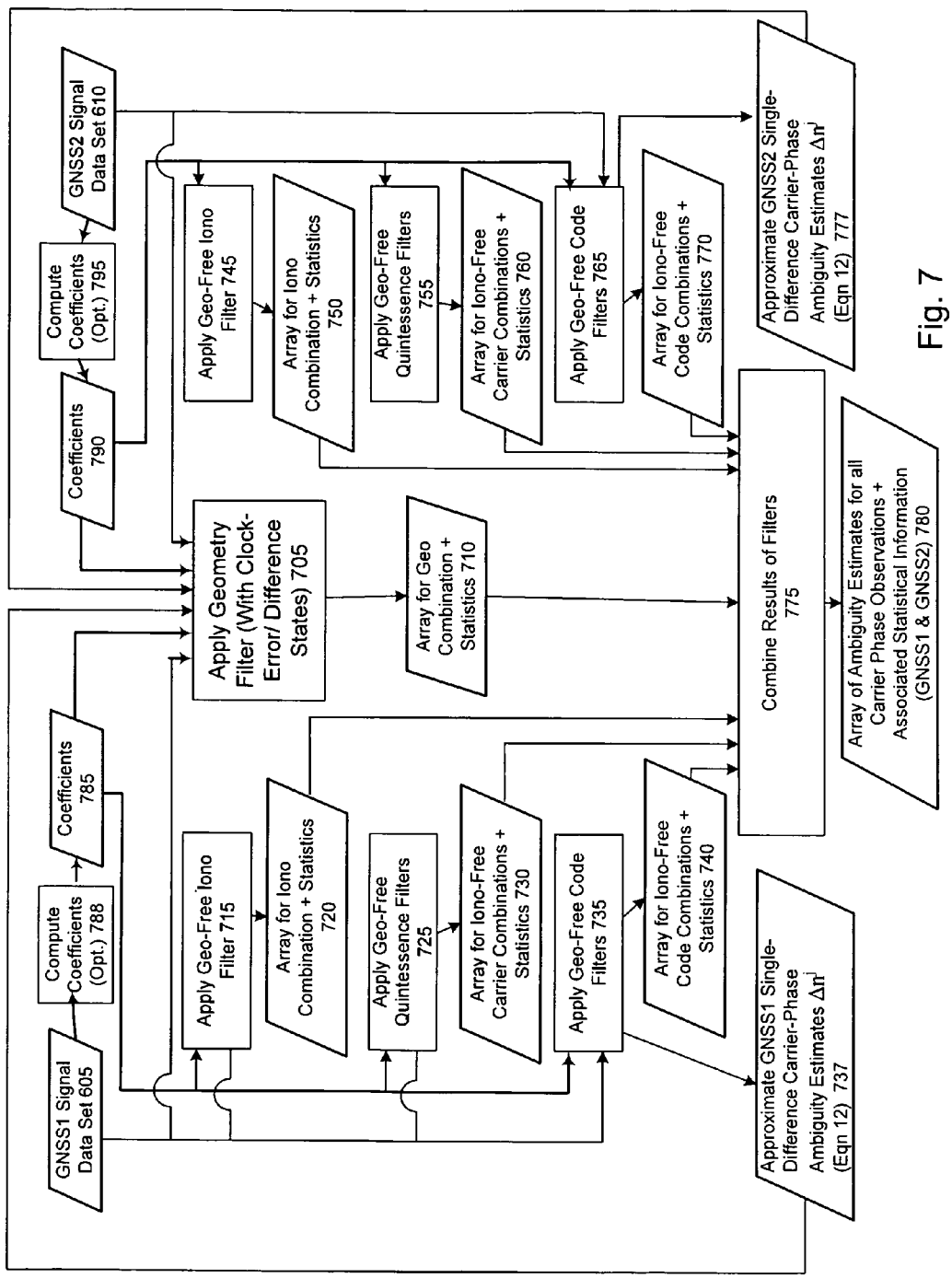
FIG. 7 is a flow chart of factorized carrier-ambiguity-resolution processing corresponding to FIG. 6.

FIG. 7 is a flow chart of factorized carrier-ambiguity-estimation processing corresponding to FIG. 6. At 705 geometry filter 665 is applied to data set 605 of the first GNSS and to data set 610 of the second GNSS using a geometry carrier-phase combination to obtain an array 710 of ambiguity estimates for the geometry carrier-phase combination and associated statistical information. At 715, bank 640 of ionosphere filters is applied to data set 605 of the first GNSS using a geometry-free ionosphere carrier-phase combination to obtain an array 720 of ambiguity estimates for the ionosphere carrier-phase combination and associated statistical information. At 725 bank or banks 640 of Quintessence filters, if provided, are applied to data set 605 of the first GNSS using a geometry-free and ionosphere-free carrier-phase combination to obtain an array 730 of ambiguity estimates for the geometry-free and ionosphere-free carrier-phase combination and associated statistical information. At 735 code filter or filters 645 are applied to data set 605 of the first GNSS using a plurality of geometry-free and ionosphere-free code-carrier combinations to obtain an array 740 of ambiguity estimates for the code-carrier combinations and associated statistical information for the plurality of transmitters.

At 745 bank 650 of ionosphere filters is applied to data set 610 of the second GNSS using a geometry-free ionosphere carrier-phase combination to obtain an array 750 of ambiguity estimates for the ionosphere carrier-phase combination and associated statistical information. At 755 bank or banks 655 of Quintessence filters, if provided, are applied to data set 610 of the second GNSS using a geometry-free and ionosphere-free carrier-phase combination to obtain an array 760 of ambiguity estimates for the geometry-free and ionosphere-free carrier-phase combination and associated statistical information. At 765 code filter or filters 660 are applied to data set 610 of the second GNSS using a plurality of geometry-free and ionosphere-free code-carrier combinations to obtain an array 770 of ambiguity estimates for the code-carrier combinations and associated statistical information for the plurality of transmitters.

The collection of arrays is combined at 775 by element 670 to produce a combined array 780 of ambiguity estimates for all carrier phase observations of the first GNSS and the second GNSS and associated statistical information. For computational efficiency, coefficients 785 may be computed at 788 for data set 605 and coefficients 790 may be computed at 795 for data set 610. If separately computed as shown, coefficients 785 and 790 are supplied to the filters as indicated.

While the architecture of FIG. 6 employs a single geometry filter 665 common to the first GNSS and the second GNSS, separate geometry filters may be employed for the first GNSS and the second GNSS if desired. Further, while the architecture of FIG. 6 employs factorized filters for computational efficiency, any or all of the filter functions may be merged into one or more larger filters. For example, an equivalent classical global filter in which all states are modeled could be used to further model the code and carrier biases. See, for example, US 2005/0101248A1 at pages 1-2.

Code-carrier filters 645 provide single-difference carrier-phase ambiguity estimates 737 for GNSS1 derived from Equation (10): $\Delta n_{GNSS1}{}^i = (\lambda^i \Delta \phi^i - \Delta R^i + \Delta B_{GNSS1} - \Delta \beta_{GNSS1})/\lambda^i$. Code-carrier filters 660 provide single-difference carrier-phase ambiguity estimates 777 for GNSS2 derived from (10): $\Delta n_{GNSS2}{}^j = (\lambda^j \Delta \phi^j - \Delta R^j + \Delta B_{GNSS2} - \Delta \beta_{GNSS2})/\lambda^j$. These ambiguity estimates for GNSS1 and GNSS2 are used to seed the geometry filter 665.

Geometry Filtering in the Presence of GLONASS Code and Phase Biases

The geometry filter component, e.g., geometry filter 665, is used to synthesize user position estimates with ambiguity estimates for all satellites in view. The geometry filter includes the following state description:

$$\begin{matrix} x \\ y \\ z \\ \Delta t_{GPS} \\ (\Delta t_{GLN} - \Delta t_{GPS}) \\ \varpi \\ \Delta n^1_{GPS} \\ \Delta n^2_{GPS} \\ \ldots \\ \Delta n^N_{GPS} \\ \Delta n^1_{GLN} \\ \Delta n^2_{GLN} \\ \ldots \\ \Delta n^M_{GLN} \\ \Delta m^1_{GPS} \\ \Delta m^2_{GPS} \\ \ldots \\ \Delta m^N_{GPS} \\ \Delta m^1_{GLN} \\ \Delta m^2_{GLN} \\ \ldots \\ \Delta m^M_{GLN} \end{matrix} \quad (11)$$

Where:
x, y, z is the estimated user position,
$\Delta t_{GPS}$ is the modified receiver offset for GPS satellites. This term includes any receiver hardware code and/or carrier phase biases for GPS satellite tracking.
$\Delta t_{GPS} - \Delta t_{GLN}$ is the modified GLONASS minus GPS receiver clock difference term. This parameter includes any difference in GLONASS minus GPS receiver hardware code and/or carrier phase biases,
ω is the GLONASS frequency bias term,
$\Delta n^i_{GPS}$ is the single-difference carrier phase ambiguity term for GPS sat i.
$\Delta n^j_{GLN}$ is the single-difference carrier phase ambiguity term for GLONASS sat j.
$\Delta m^i_{GPS}$ is the carrier phase multipath term for GPS sat i.
$\Delta m^j_{GLN}$ is the carrier phase multipath term for GLONASS sat j.

Note that the carrier phase ambiguity terms and multipath terms included in the Geometry Filter state vector relate to a particular linear combination of the GPS/GLONASS multi-band data—for example the minimum error L1/L2 combination. Other linear combinations can be used if desired, such as L1-only, iono-free and minimum error.

Approximate values for the carrier phase ambiguities are set in the geometry filter, e.g., geometry filter 665, to initialize the estimation process. The output of single-difference code-carrier filters, e.g., within code filter 645 and 660, can be used to estimate the approximate ambiguities as described in (10). Of direct importance is the initialization of the single-difference GLONASS carrier phase ambiguities in the presence of receiver hardware code and/or phase biases, hence:

$$\Delta n_{GLN}{}^j = (\lambda^j \Delta \phi^j - \Delta R^j + \Delta B_{GLN} - \Delta \beta_{GLN})/\lambda^j \quad (12)$$

As shown in FIG. 6 and FIG. 7, carrier phase ambiguities $\Delta n^j$ for GNSS1 737 supplied by process 735 of code filters 645 and carrier phase ambiguities $\Delta n^j$ for GNSS2 777 supplied by process 765 of code filters 660 are provided as initial values to process 705 of geometry filter 665.

Note that the GLONASS code and phase biases $\Delta B_{GLN}$ and $\Delta \beta_{GLN}$ in (12) may vary slightly for each GLONASS satellite because of the different nominal frequencies, however, most receiver hardware seems to provide relatively constant biases even across the range of broadcast GLONASS channels. Furthermore, the Geometry Filter model (11) includes a parameter $\omega$ to absorb any remaining frequency-dependent biases.

When code-carrier estimated ambiguities from (12) are used to derive the approximate ambiguities for use in (11), the estimated state parameters become:

$$\begin{array}{l} x \\ y \\ z \\ \Delta t_{GPS} \\ (\Delta B_{GLN} - \Delta \beta_{GLN}) \\ \varpi \\ \Delta n^1_{GPS} \\ \Delta n^2_{GPS} \\ \ldots \\ \Delta n^N_{GPS} \\ (\Delta n^1_{GLN} + [\Delta B_{GLN} - \Delta \beta_{GLN}]/\lambda^1) \\ (\Delta n^2_{GLN} + [\Delta B_{GLN} - \Delta \beta_{GLN}]/\lambda^2) \\ \ldots \\ (\Delta n^M_{GLN} + [\Delta B_{GLN} - \Delta \beta_{GLN}]/\lambda^M) \\ \Delta m^1_{GPS} \\ \Delta m^2_{GPS} \\ \ldots \\ \Delta m^N_{GPS} \\ \Delta m^1_{GLN} \\ \Delta m^2_{GLN} \\ \ldots \\ \Delta m^M_{GLN} \end{array} \quad (13)$$

Each GLONASS satellite ambiguity term in (13) contains receiver hardware code and carrier phase bias terms scaled by the respective GLONASS satellite wavelength. Any common mode error on the ambiguities is absorbed in a common clock term. Therefore, as a result of the carrier phase ambiguities being offset, the GLONASS minus GPS clock term also includes the mean GLONASS code and carrier biases.

Impact on FAMCAR Solution

The geometry filter ambiguity estimates produced from the Geometry Filter (13) are used in the factorized carrier ambiguity resolution (FAMCAR) combination step, e.g., step 775 performed in element 670, to produce L1 and L2 ambiguity estimates for each satellite. The resultant ambiguities, presented below in single-difference form, are offset by the GLONASS code and carrier bias terms according to:

$$\begin{array}{l} _{L1}\Delta n^1_{GPS} \\ _{L2}\Delta n^1_{GPS} \\ _{L1}\Delta n^2_{GPS} \\ _{L2}\Delta n^2_{GPS} \\ \ldots \\ _{L1}\Delta n^N_{GPS} \\ _{L2}\Delta n^N_{GPS} \\ _{L1}\Delta n^1_{GLN} + (\Delta B_{GLN} - \Delta \beta_{GLN})/_{L1}\lambda^1_{GLN} \\ _{L2}\Delta n^1_{GLN} + (\Delta B_{GLN} - \Delta \beta_{GLN})/_{L2}\lambda^1_{GLN} \\ _{L1}\Delta n^2_{GLN} + (\Delta B_{GLN} - \Delta \beta_{GLN})/_{L1}\lambda^2_{GLN} \\ _{L2}\Delta n^2_{GLN} + (\Delta B_{GLN} - \Delta \beta_{GLN})/_{L2}\lambda^2_{GLN} \\ \ldots \\ _{L1}\Delta n^M_{GLN} + (\Delta B_{GLN} - \Delta \beta_{GLN})/_{L1}\lambda^M_{GLN} \\ _{L2}\Delta n^M_{GLN} + (\Delta B_{GLN} - \Delta \beta_{GLN})/_{L2}\lambda^M_{GLN} \end{array} \quad (14)$$

The impact of GLONASS code and carrier bias terms is a linear error in the single-difference L1 and L2 GLONASS ambiguities.

Processing GLONASS Data

Code-carrier derived ambiguities are used to seed the geometry filter component, e.g., geometry filter 665, as described above. The code-carrier derived ambiguities are potentially corrupted by code/carrier hardware bias terms (as shown in equation (10)). The code-carrier bias error gets absorbed in the clock error term estimated in the geometry filter. The output of the FAMCAR estimation process is a set of double-difference ambiguities for the L1/L2 bands. These are presented to the least squares operation, e.g., least squares operation 850, as single difference because the GLONASS data, unlike GPS data, must be frequency-scaled. The GLONASS double-difference ambiguities need to be adjusted to the correct reference ambiguity term as shown in (7). A change in the GLONASS reference ambiguity term is just a shift operation which can be applied in a post adjustment operation.

The following example illustrates how the receiver hardware code minus carrier bias can be used to correct GLONASS L1 carrier phase ambiguities.

The receiver hardware code minus carrier bias was found to be 82 m (i.e. $\Delta B_{GLN} - \Delta \beta_{GLN} = 82$ m.

The reference GLONASS satellite for the example was satellite 4, which has a wavelength of 0.186743 m. The reference satellite L1 ambiguity adjustment is therefore given by round (82/0.186743)=round (439.11)=439 cycles (note that the ambiguity adjustment for the reference satellite must be rounded to an integer value).

The correction to the single-difference ambiguity for GLONASS satellites is: $439*(\lambda^r/\lambda^s)$ Hence for GLONASS satellites 14 and 3, with wavelengths 0.186874 and 0.186351, the single-difference L1 ambiguity adjustments are 438.692 and 439.923 cycles respectively.

Figure 8:
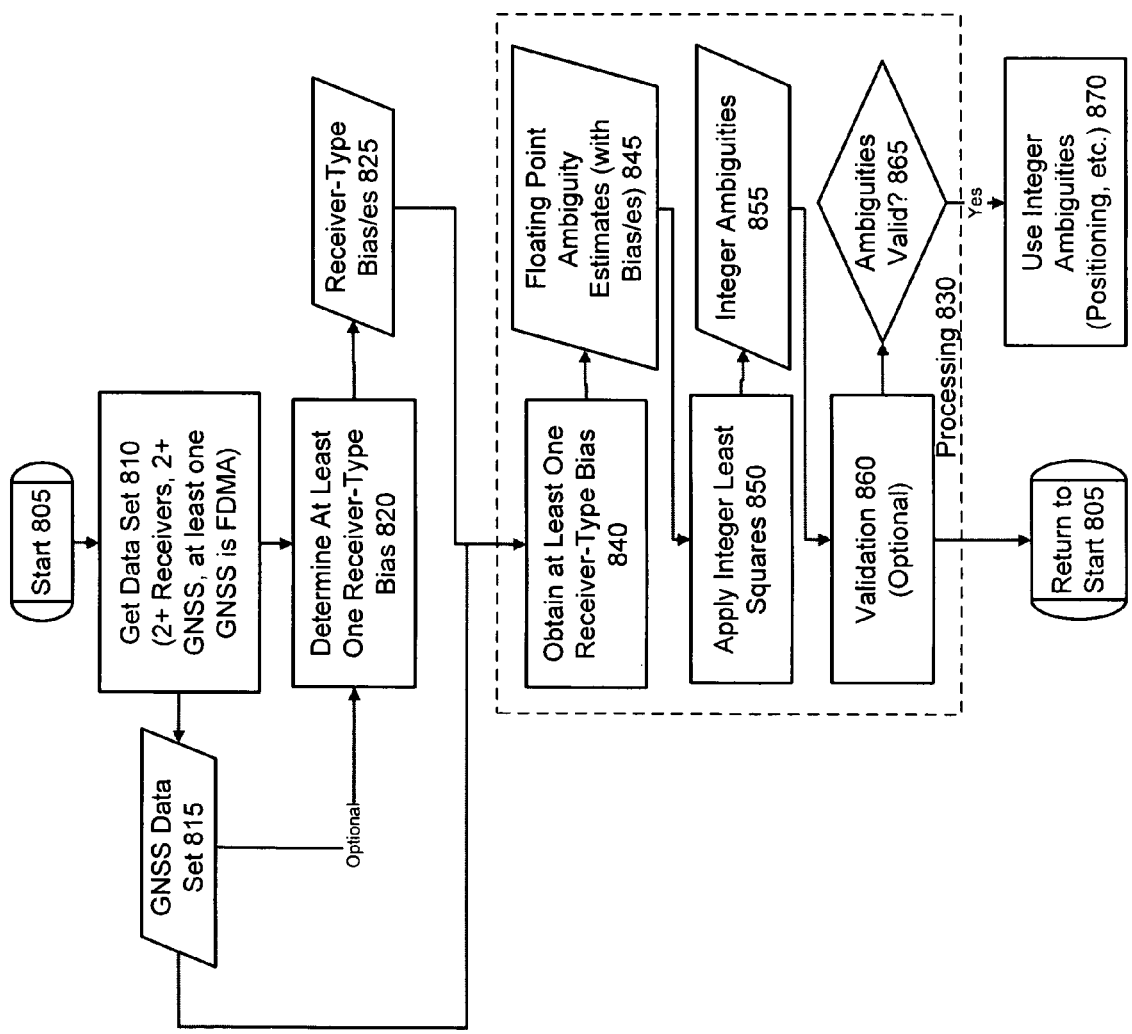
FIG. 8 is a high-level flow chart of a multi-GNSS processing scheme in accordance with some embodiments of the invention.

FIG. 8 is a high-level flow chart of a multi-GNSS processing scheme in accordance with some embodiments of the invention. The scheme is carried out in a computer processor which may be but need not be a processor of a GNSS receiver. The process starts at 805. At step 810 a data set 815 is obtained representing GNSS measurements taken at multiple receivers from multiple GNSS wherein one of the GNSS is FDMA such as GLONASS. At step 820, at least one receiver-type bias 825 is determined. Variations of step 820 are explained in more detail below; for some variations the GNSS data set 815 is employed at step 820 and thus GNSS data set 815 is shown as optionally supplied to step 820. Data set 815 is processed, based on the receiver-type bias(es) 825 in a series of steps within a process 830. At step 840, a float solution of floating point carrier ambiguity estimates 845 based on at least one receiver-type bias is prepared, such as by applying a Kalman filter. At step 850, integer least squares is applied to the float solution to produce a set of carrier integer ambiguities 855. At step 860, integer ambiguities are optionally subjected to validation. If validation is performed, the validation result is examined at step 865 to determine validity of the integer ambiguities. If determined to be valid, the integer ambiguities are used in a further process 870, such as determining position or preparing network corrections. The process repeats as needed.

According to another embodiment an apparatus is provided configured for performing the above outlined operations for processing data collected by at least two receivers from multiple satellites of multiple GNSS where at least one GNSS is FDMA.

According to another embodiment an apparatus for processing data collected by at least two receivers from multiple satellites of multiple GNSS where at least one GNSS is FDMA, comprises:

a. Receiving means for obtaining data sets comprising a first data set from a first receiver and a second data set from a second receiver, wherein the first data set comprises a first FDMA data set and the second data set comprises a second FDMA data set, wherein at least one of a code bias and a phase bias may exist between the first FDMA data set and the second FDMA data set, b. Bias determining means for determining at least one receiver-type bias to be applied when the data sets are obtained from receivers of different types, c. Processing means for processing the data sets, based on the at least one receiver-type bias, to estimate carrier floating-point ambiguities, and d. Ambiguity determining means for determining carrier integer ambiguities from the floating-point ambiguities.

The apparatus may comprise a processor and a storage element with storing code sections or program instructions that, when loaded enable the processor to process data collected by at least two receivers from multiple satellites of multiple GNSS where at least one GNSS is FDMA as outlined above, i.e. by obtaining data sets comprising a first data set from a first receiver and a second data set from a second receiver, wherein the first data set comprises a first FDMA data set and the second data set comprises a second FDMA data set, wherein at least one of a code bias and a phase bias may exist between the first FDMA data set and the second FDMA data set, determining at least one receiver-type bias to be applied when the data sets are obtained from receivers of different types, processing the data sets, based on the at least one receiver-type bias, to estimate carrier floating-point ambiguities, and determining carrier integer ambiguities from the floating-point ambiguities.

The apparatus may be included in or form part of a rover station, a reference station or a reference station network or may be provided in distributed manner at a rover station and reference station or reference station network.

Numerous variants of the process of FIG. 8 are contemplated within the spirit and scope of the invention. For a single-reference-station RTK scenario, GNSS data set 815 is a set of data per epoch from each of the rover and a reference station. Preparing the float solution for this scenario can use a Kalman filter which operates on single-differenced data if desired. The integer ambiguities can be used in this scenario to determine rover position. For a network RTK scenario, GNSS data set 815 is a set of data per epoch from multiple reference stations of a network. Preparing the float solution for this scenario can use a Kalman filter which operates on the data without single differencing. The integer ambiguities can be used in this scenario to prepare network corrections to be transmitted for use by one or more rovers. For a post-processing scenario, GNSS data set can be a set of data from each of the rover and one or more reference stations, and may encompass one or multiple epochs. Preparing the float solution for this scenario can use a Kalman filter which operates on the data of one or multiple epochs. The integer ambiguities can be used in this scenario to determine rover positions.

Figure 9:
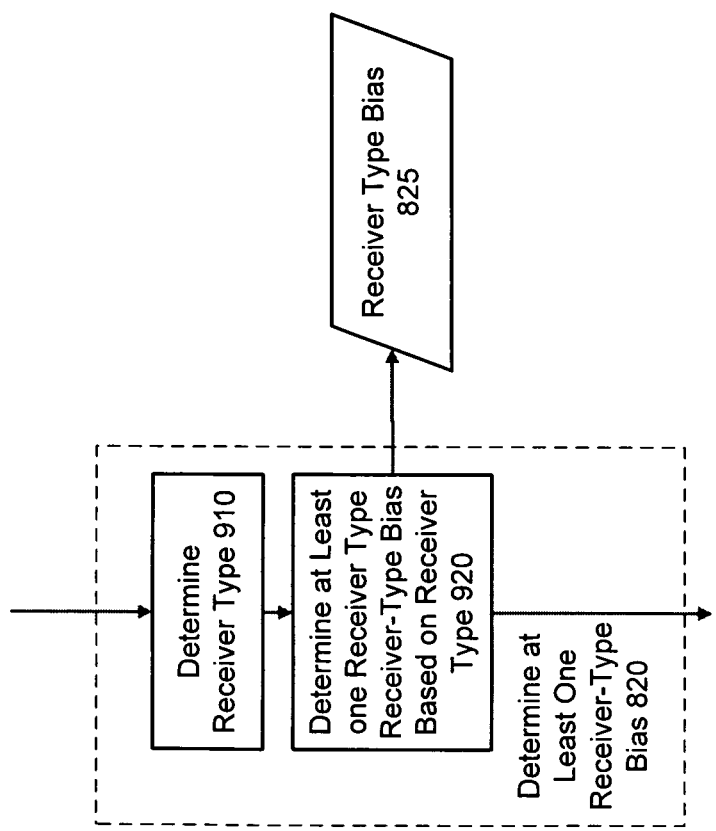
FIG. 9 shows a variant of the process of FIG. 8.

FIG. 9 shows a variant of step 820 of FIG. 8. At 910 at least one receiver type 910 is determined. At 920 at least one receiver-type bias is determined based on the determined receiver type. In some scenarios, the receiver type can be determined by considering at least one of: receiver manufacturer, receiver model, receiver firmware version, receiver serial number, antenna manufacturer, antenna model, antenna serial number, receiver descriptor, antenna descriptor, receiver station number, receiver location, and data format. This information may be available in a message from the receiver provided with the data (e.g., RTCM 3.1 receiver-type message), from network setup data (e.g., receiver information stored in memory accessible to a network processor), from a table containing receiver identification data by station number and/or receiver location (e.g., IGS reference-station data obtained via Internet), and/or from the format of the reference data (Trimble CMR data message format). IGS is the International GNSS Service, www.igs.org. RTCM is the Radio Technical Commission for Maritime Services, www.rtcm.org. CMR is the Compact Measurement Record Format, e.g., Revision 2.0, May 7, 2001; see N. Talbot, Compact Data Transmission Standard for High-Precision GPS, Proceedings of the 9$^{th}$ International Technical Meeting of the Satellite Division of the Institute of Navigation, Kansas City, Mo., September 17-20. The receiver-type bias can be determined from the receiver type by looking in a table for at least one of a code bias and a carrier bias to be applied when processing FDMA GNSS measurement data (e.g. GLONASS measurement data) provided by the receiver. The following table is an example of biases to be applied based on reference receiver type when processing data from a rover of Type 1:

TABLE 1

| Reference Receiver Type | Carrier Bias $\beta_{GLN}$ | Code Bias $B_{GLN}$ | Net Effect on Ambiguities $(B_{GLN} - \beta_{GLN})/\lambda^r$ |
|---|---|---|---|
| Type 1 | None | None | None |
| Type 2 | ~130m | ~130m | None |
| Type 3 | None | ~81m | ~81m/$\lambda^r$ |

Figure 10:
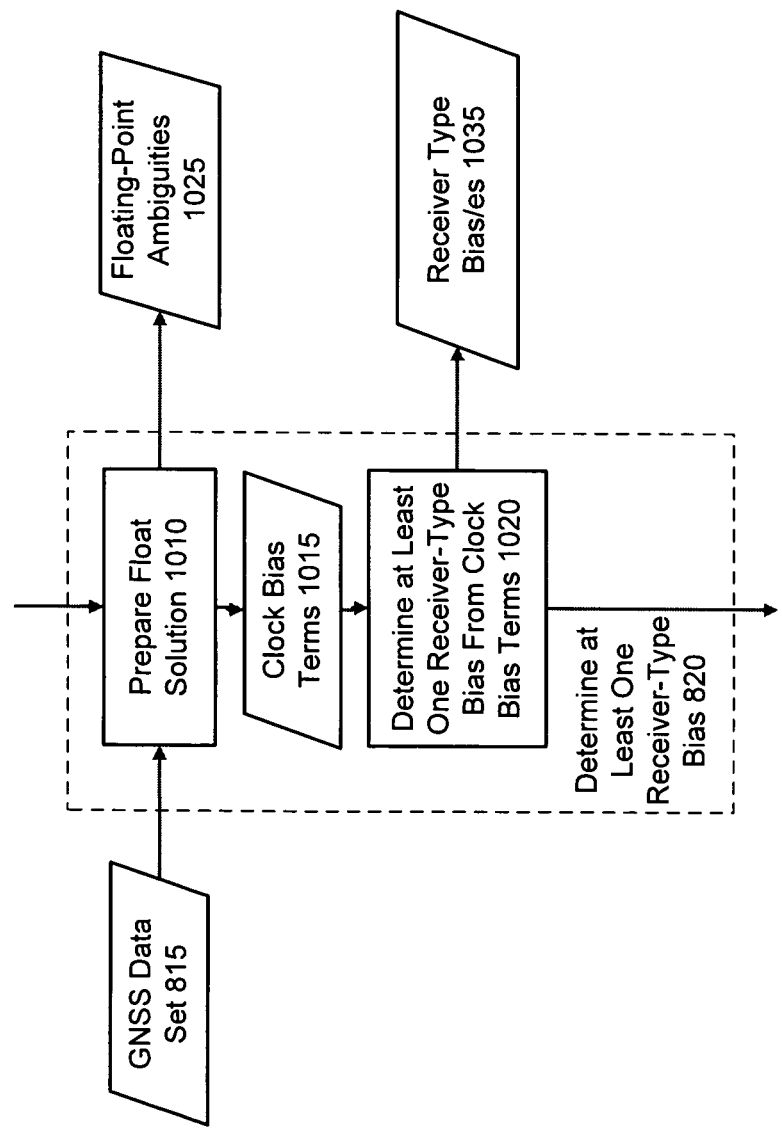
FIG. 10 shows a further variant of the process of FIG. 8.

FIG. 10 shows a further variant of step 820 of FIG. 8. At 1010 the GNSS data set 815 is used to prepare a float solution of floating-point ambiguities 1025, using for example a Kalman filter having states for receiver clock biases as described above. At 1020, the resulting receiver clock bias terms 1015 are used to determine at least one receiver-type bias 1035, e.g., a code bias and/or a carrier bias for the reference receiver. The code bias and carrier bias are determined from the clock bias terms as described above. The determined code and carrier biases can be applied as determined or, alternatively, they can be used to determine a receiver type and from the determined receiver type then apply standard bias terms for the determined receiver type as the example of Table 1.

Figure 11:
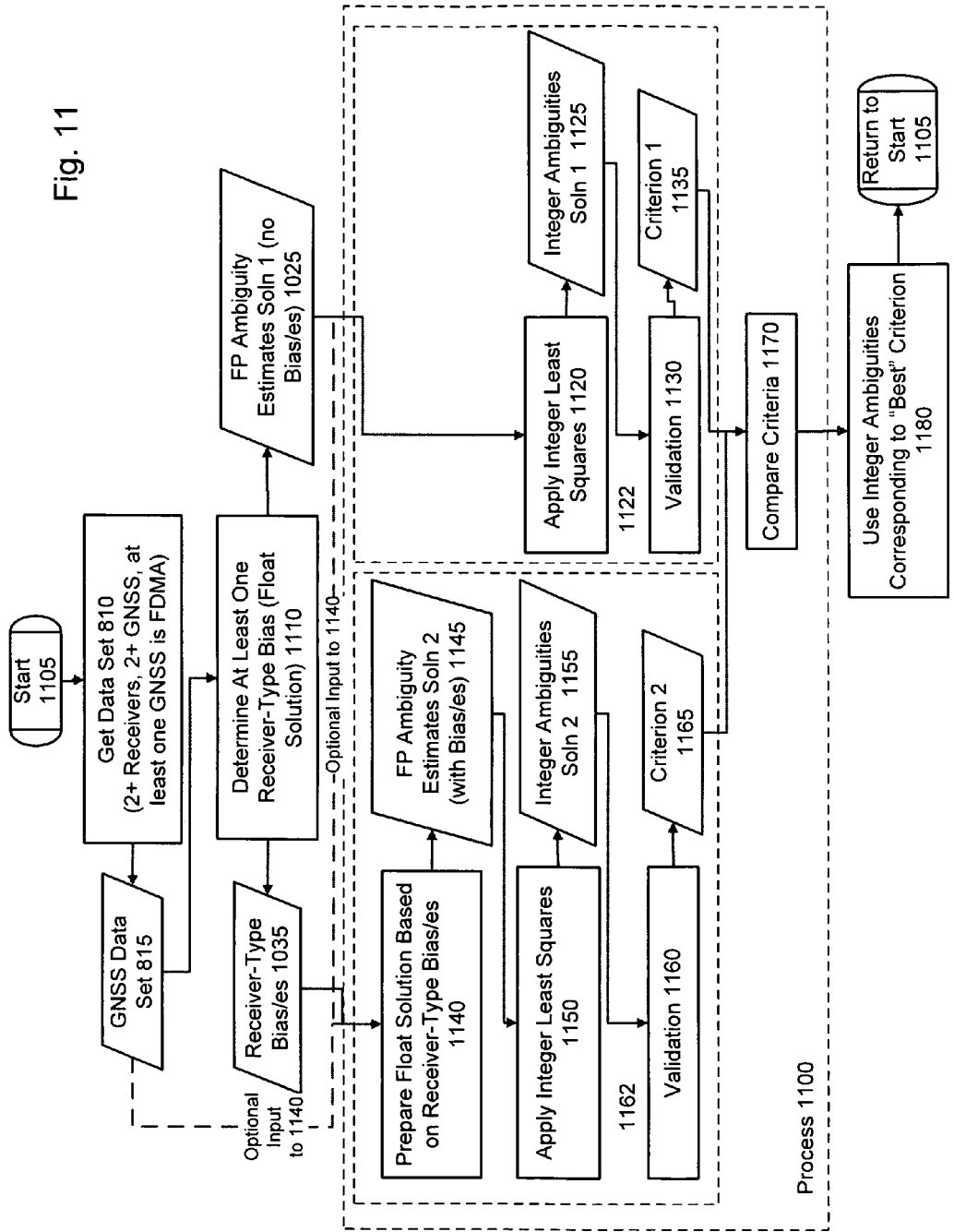
FIG. 11 shows a variant of the process of FIG. 8 and FIG. 10.

FIG. 11 shows a further variant of the process of FIG. 8 and FIG. 10. The process starts at 1105. As in FIG. 8, at step 810 a data set 815 is obtained representing GNSS measurements taken at multiple receivers from multiple GNSS wherein one of the GNSS is FDMA such as GLONASS. At step 1110, data set 815 is processed as described with reference to FIG. 10 to produce a first float solution 1025 (with no biases applied at this stage) and to determine receiver type biases 1035 from clock bias terms of the float solution filter. A bifurcated process 1100 takes as inputs the first float solution 1025 and the receiver-type biases 1035 (code bias and/or carrier bias), and determines whether or not to apply the receiver-type biases. In a first branch of process 1100 shown at 1122, integer least squares is applied at 1120 to the first float solution 1025, producing a first integer ambiguities solution 1125. A validation process 1130 is applied to the first integer ambiguities solution 1125 at 1130 to produce a first validation criterion 1135. In a second branch of process 1100 shown at 1162, a step 1140 prepares a second float solution 1145 based on at least one receiver-type bias 1035. Integer least squares is applied at 1150 to the second float solution 1145, producing a second integer ambiguities solution 1155. A validation process 1160 is applied to the second integer ambiguities solution 1155 at 1160 to produce a second validation criterion 1165. The first validation criterion 1135 and the second validation criterion 1165 are compared at 1170 to determine whether the first integer ambiguities solution 1125 or the second integer ambiguities solution 1155 is to be used, e.g., for position determination and/or network corrections. The process repeats as desired by returning to 1105, e.g., for additional epochs in RTK processing or for additional data sets in post-processing.

The aim of the validation procedures, e.g., validation procedures 860, 1130 and 1160 is to determine if a particular integer-ambiguity solution is correct. There are many existing statistical procedures used to validate least-squares and Kalman filter results (see for example Walpole, R. E. and Myers, R. H, 1978, Probability and Statistics for Engineers and Scientists, Macmillan publishing, New York, N.Y., ISBN: 0-02-979870-1, pp. 249-252). There are also many existing techniques for validating integer ambiguity solutions and any of these techniques are applicable to this invention. A detailed description of various integer ambiguity validation schemes is provided in Verhagen, A. A. 2004, The GNSS integer ambiguities: estimation and validation, PhD Thesis, Delft Institute of Earth Observation and Space Systems, Delft Institute of Technology. For the application at hand, the aim of validation is to first determine if a receiver hardware code bias and/or carrier phase bias needs to be applied to the data. Second, if biases need to be applied, the validation scheme should also ensure that the bias values applied are correct.

The ratio of the measurement residual norms for the $2^{nd}$ best ambiguity candidate, divided by the best candidate is a widely used technique for assessing whether or not the best integer ambiguities are correct (see Wang, J. Stewart, M. P. & Tsakiri, M, 1998, A discrimination test procedure for ambiguity resolution on-the-fly, Journal of Geodesy, Vol. 72, pp. 644-653). Large search ratios (values >2) tend to indicate that the best integer ambiguity candidate is correct (see Teunissen, P. J. G, and Verhagen, S, 2004, On the foundation of the popular ratio test for GNSS ambiguity resolution, ION-GNSS-2004, Long Beach, Calif., for a discussion on the search ratio and its use). Hence if the search ratios obtained from 1135 are always larger than those from 1165, the solution without the GLONASS receiver hardware code minus carrier bias may be accepted over the solution with the biases applied (and vice versa).

An alternative method for comparing float solution 1025 with float solution 1145 is to form a ratio of the residual norms of the top integer candidates produced by integer ambiguities solutions 1125 and 1155 respectively. If the residual norms from 1125 are significantly smaller than those from 1155, then a decision can be made to accept Solution 1 over Solution 2 (and vice versa).

A Chi-Squared test can be used to check the validity of the residual norms (variances) obtained from integer ambiguity solutions 1125 and 1155. If either of integer ambiguity solutions 1125 or 1155 passes the statistical test at a particular confidence level, and the other fails, then this helps to validate one of the solutions. It is also possible that both of integer ambiguity solutions 1125 and 1155 will pass or fail. If both pass or fail, then this may mean that one solution cannot be accepted over the other until additional data is acquired and processed.

A recently developed technique for validating integer ambiguity solutions is termed Integer Aperture Estimation (see P. Teunissen, Integer aperture bootstrapping: a new GNSS ambiguity estimator with controllable fail-rate, Journal of Geodesy, Springer, 25.07.2005, vol. 79, no. 6, pp. 389-397; and Verhagen, A. A. 2004, The GNSS integer ambiguities: estimation and validation, PhD Thesis, Delft Institute of Earth Observation and Space Systems, Delft Institute of Technology). This technique can be used to test the acceptability of integer ambiguity solutions obtained with particular GLONASS receiver hardware code and/or carrier phase biases applied. The benefit of the Integer Aperture Estimation technique is that it is rigorous from a statistical standpoint.

Step 1140 can optionally prepare the second float solution 1145 directly from data set 815 and receiver type biases 1035 if desired. A more computationally efficient alternative is to apply the receiver-type biases at step 1140 to the first float solution 1025 to produce the second float solution 1145. The receiver-type biases can be applied at any stage prior to applying integer least squares at 1150, since these biases are linearly related to the ambiguities in the observation models in Equations 5 and 8 above. That is, the receiver-type biases can be applied to data set 815 prior to preparing the second float solution 1145 at 1140, or at an intermediate stage of preparing the second float solution 1145 at 1140 from data set 815, or to the first float solution 1025 to produce the second float solution 1145.

Figure 12:
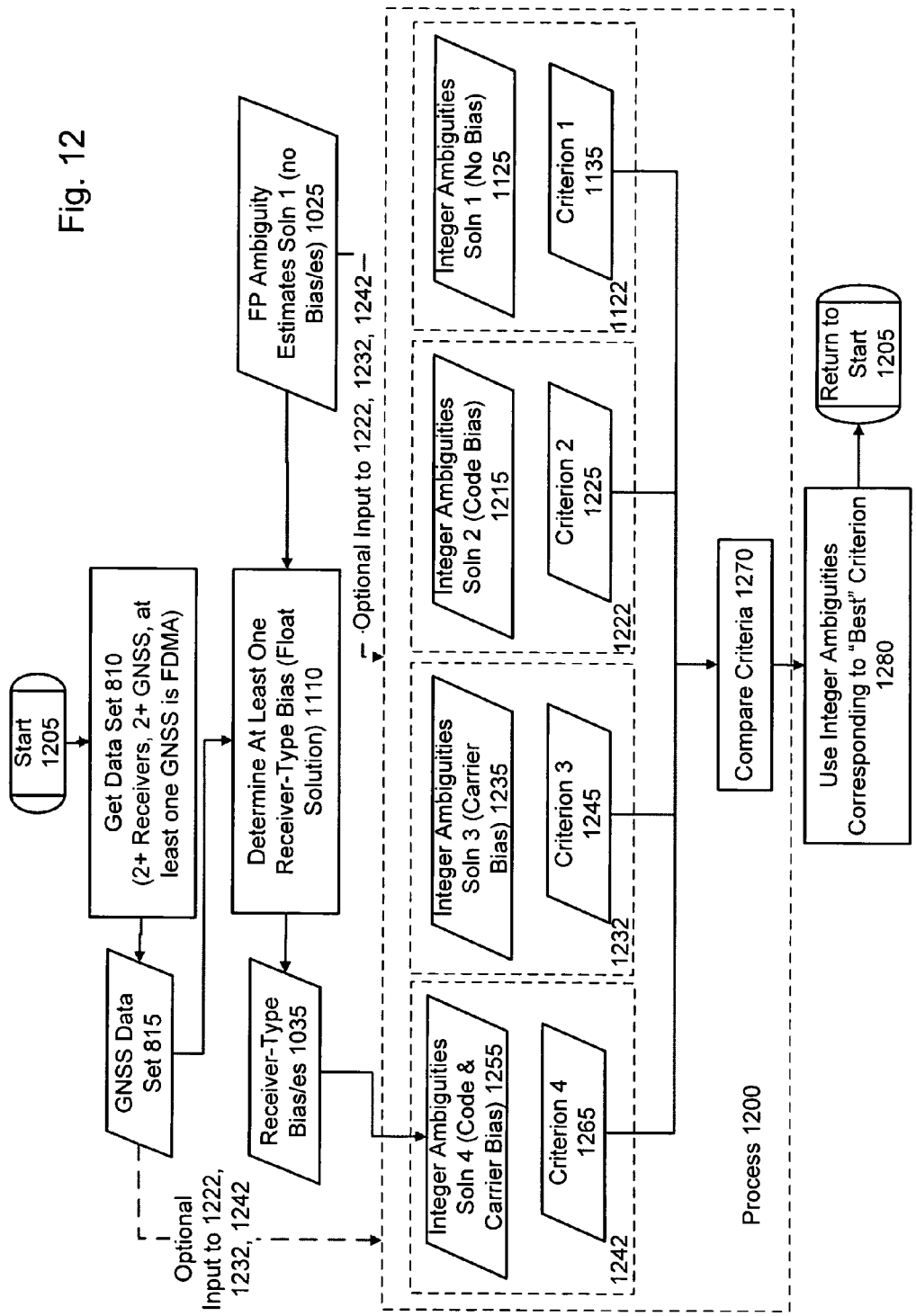
FIG. 12 shows a variant of the process of FIG. 8 and FIG. 10 and FIG. 11.

FIG. 12 shows a variant of the process of FIG. 8 and FIG. 10 and FIG. 11. The process starts at 1205. As in FIG. 8, at step 810 a data set 815 is obtained representing GNSS measurements taken at multiple receivers from multiple GNSS wherein one of the GNSS is FDMA such as GLONASS. At step 1110, data set 815 is processed as described with reference to FIG. 10 to produce a first float solution 1025 (with no biases applied at this stage) and to determine receiver type biases 1035 from clock bias terms of the float solution filter. A four-branch process 1200 takes as inputs the first float solution 1025 and the receiver-type biases 1035 (code bias and carrier bias), and determines whether or not to apply one or both or neither of the receiver-type biases. A first branch of process 1200 is the same as 1122 of FIG. 11, providing a first integer ambiguities solution 1125 (no receiver-type biases applied) and a first validation criterion 1135. A second branch 1222 of process 1200 is substantially as shown at 1162, except that a second integer ambiguities solution 1215 based on a receiver-type code bias (not carrier bias) is prepared and validated to produce a second validation criterion 1225. A third branch 1232 of process 1200 is also substantially as shown at 1162, except that a third integer ambiguities solution 1235 based on a receiver-type carrier bias is prepared and validated to produce a third validation criterion 1245. A fourth branch 1242 of process 1200 is also substantially as shown at 1162, except that a fourth integer ambiguities solution 1255 based on a receiver-type code bias and a receiver-type carrier bias is prepared and validated to produce a fourth validation criterion 1265. Alternatively, any one of branches 1222, 1232 and 1242 may be deleted. The validation criteria 1135, 1225, 1245 and 1265 (if present) are compared at 1270 to determine whether the first integer ambiguities solution 1125 or the second integer ambiguities solution 1225 or the third integer ambiguities solution 1245 or the fourth integer ambiguities solution 1265 is to be used, e.g., for position determination and/or network corrections. The process repeats as desired by returning to 1205, e.g., for additional epochs in RTK processing or for additional data sets in post-processing.

At with branch 1162 of FIG. 11, float solutions prepared within branches 1222, 1232 and/or 1242 as a precursor to obtaining the integer ambiguities solutions 1215, 1235 and/or 1255 can optionally be prepared directly from data set 815 and receiver type biases 1035, or the receiver-type biases can be applied to the first float solution 1025 to produce bias-adjusted float solutions from which the integer ambiguities solutions are obtained.

The receiver-type biases can be determined in any of a multitude of ways. The geometry filter described above (and in U.S. Pat. No. 7,312,747) includes a clock offset parameter representing system-clock offset between the GNSS systems, e.g., between GPS and GLONASS. Receiver hardware biases show up in this clock offset parameter. When performing single-differences between receivers, as in RTK processing, the clock offset parameter is the only state of the filter which observes the difference between receiver clocks of the two GNSS.

Figure 13:
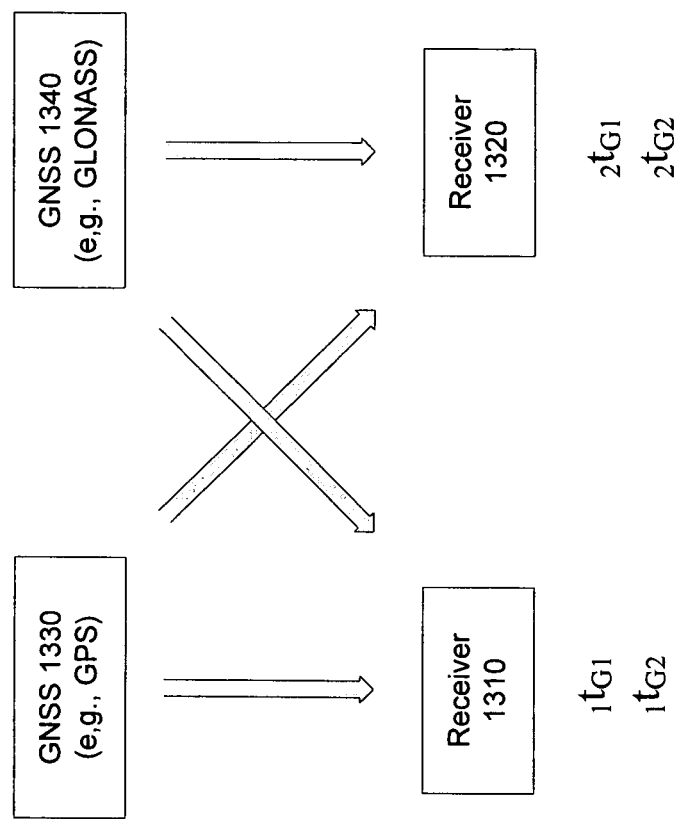
FIG. 13 illustrates the relationship of clock-bias terms.

FIG. 13 illustrates the relationship of clock-bias terms. A first receiver 1310 and a second receiver 1320 each receive signals from satellites of a first GNSS 1330 (e.g., GPS) and from satellites of a second GNSS 1340 (e.g., GLONASS). A clock bias term $_1t_{G1}$ represents clock bias of GNSS 1330 at receiver 1310, a clock bias term $_1t_{G2}$ represents clock bias of GNSS 1340 at receiver 1310, a clock bias term $_2t_{G1}$ represents clock bias of GNSS 1330 at receiver 1320, and a clock bias term $_2t_{G2}$ represents clock bias of GNSS 1340 at receiver 1320. The system offset is defined as $[_1t_{G1}-_2t_{G1}]-[_1t_{G2}-_2t_{G2}]$. This can be calculated from individual parameters of the filter as described in (3) and (4) above, or the differences can be modeled as a filter state. The system offset can also be represented as $[_1t_{G1}-_1t_{G2}]-[_2t_{G1}-_2t_{G2}]$. That is, single differences can be formed in RTK or differential processing first between receivers followed by doubled differences between GNSS, or vice versa.

System clock differences cancel in single differencing along with satellite clock errors. This can be used to determine code bias; carrier bias can only be determined by fixing integers. With FDMA GNSS (e.g., GALILEO), double differencing cannot be used as with CDMA GNSS (e.g., GPS). Because of the different frequencies per satellite, the processing must work with absolute ambiguities rather than with differences. This does not create a problem with a float solution because a modeled term that is constant (such as the clock term which absorbs the receiver-type bias) causes no error in positioning; the clock error term absorbs all constant errors and they do not affect the position solution. Float-solution ambiguity terms absorb everything that is constant per satellite; thus a constant per satellite has an effect on float-solution ambiguities but is constant for all measurements (at multiple receivers) of that satellite's signals. It is when ambiguities are fixed as integers that a constant per satellite is no long absorbed and will have an effect on the position solution. Thus, it is only necessary to apply a receiver-type bias when an integer ambiguity solution is sought.

The above apparatus described with regard to FIG. 8 in another embodiment is also provided for performing the operations as outlined with regard to FIGS. 9-12.

Specifically, in an embodiment the bias determining means is configured to determine a receiver type by considering at least one of: receiver manufacturer, receiver model, receiver firmware version, receiver serial number, antenna manufacturer, antenna model, and antenna serial number, e.g., with a RTCM 3.1 receiver-type message.

Moreover, the bias determining means may determine a receiver type by examining a message containing at least one of a receiver descriptor and an antenna descriptor, e.g., in a RTCM 3.1 receiver-type message.

Moreover, the bias determining means may examine a data stream containing data collected by the receiver and at least one of a receiver descriptor and an antenna descriptor, e.g., with a RTCM 3.1 receiver-type message in data stream.

Moreover, the bias determining means may examine at least one manually-input descriptor. For example in a network setup by manual user input or selection of receiver type.

Moreover, the bias determining means may examine a table containing receiver identification data by one of station number and receiver location, e.g., using IGS via internet.

Moreover, the bias determining means may query a source having receiver type information, e.g. also using IGS via internet.

Moreover, the bias determining means may deduce the receiver type from characteristics of a data stream, e.g., with the CMR format signifying Type 1 or Type 2 or Type 3 receiver with recent update, while non-CMR format signifies Type 3 receiver without recent update.

Still further, the apparatus may be configured to determine the bias by a lookup table.

Correspondingly, in another embodiment the bias determining means may look in a table for at least one of: a code bias and/or phase bias to be applied for the receiver.

Moreover, the bias determining means may consult a table for an indication of whether a bias is to be applied to code and whether a bias is to be applied to phase.

Still further, the apparatus may be configured to determine the bias by calculation More precisely, in an embodiment of the apparatus the bias determining means is configured to calculate at least one of a code bias and a phase bias from at least one clock bias term of a geometry filter.

Moreover, the bias determining means may calculate at least one of a code bias and a phase bias from a difference between clock bias terms of single-receiver navigation solutions for a reference receiver and a rover receiver.

Moreover the bias determining means may calculate at least one of a code bias and a phase bias from a clock bias term of a differential GNSS solution.

Moreover, the bias determining means may calculate a code bias by combining at least two of: a code bias determined from at least one clock bias term of a geometry filter, a code bias determined from a difference between clock bias terms of single-receiver navigation solutions for a reference receiver and a rover receiver, and a code bias determined from a clock bias term of a differential GNSS solution.

Moreover, the bias determining means may calculate a phase bias by combining at least two of: a phase bias determined from at least one clock bias term of a geometry filter, a phase bias determined from a difference between clock bias terms of single-receiver navigation solutions for a reference receiver and a rover receiver, and a phase bias determined from a clock bias term of a differential GNSS solution.

Still further, the apparatus may be configured to apply the bias in the process of determining a position based on data from receivers of different type.

In an embodiment of the apparatus the processing means combines a bias value with the FDMA data set from the first receiver.

Moreover the processing means may combine the bias value with a portion of the FDMA data set from the first receiver representing code measurements of an FDMA GNSS.

Moreover, the FDMA GNSS may comprise multiple satellites each transmitting a signal having a particular carrier wavelength, and the processing means may process the FDMA data set based on the at least one receiver-type bias by combining a bias value with a portion of the FDMA data set from the first receiver representing phase measurements of a given satellite of the FDMA GNSS, wherein the bias value is divided by the carrier wavelength of signal from the given satellite. (for Type 3).

Still further, the apparatus may be configured to be applied to RTK, network processing and post processing.

A rover receiver and a reference receiver may be provided, and wherein the processing means may estimate differential carrier floating-point ambiguities, further comprising applying the carrier integer ambiguities to determine a rover position.

The receivers may be reference receivers of a reference station network, further configured to apply the carrier ambiguities to produce network correction data.

The data sets may comprise data previously collected by the receivers and stored for post-processing, and the processing means may retrieve the data sets from storage for post-processing.

The above outlined apparatus in another embodiment is configured to apply the bias elimination during floating point ambiguity estimation before integer ambiguities are fixed.

In this respect the processing means may first apply the at least one receiver-type bias to the FDMA data from the first receiver to produce corrected data sets and to subsequently process the corrected data sets to obtain the carrier floating-point ambiguities.

Moreover, the processing means may process the data sets to obtain an intermediate data set, which may be a float solution or a step leading to a float solution, and may apply the at least one receiver-type bias to the intermediate data set to obtain a corrected intermediate data set.

Moreover, the processing means may further process the corrected intermediate data set to estimate the carrier floating-point ambiguities.

Moreover, the intermediate data set may comprise bias-corrected floating-point ambiguities, and the ambiguity determining means may determine carrier integer ambiguities from the bias-corrected floating-point ambiguities.

Still further, in another embodiment the apparatus is configured to determine the bias by an alternate calculation In this respect the processing means may first estimate carrier ambiguities, which may be integer or non-integer, without applying the at least one receiver-type bias and to then correct the carrier ambiguities by applying the at least one receiver-type bias to obtain the carrier floating-point ambiguities.

Moreover, the processing means may estimate the floating-point ambiguities and then applying the at least one receiver-type bias to the float solution ambiguities.

Moreover, the ambiguity determining means may determine at least two integer ambiguity candidate sets with at least one confidence indicator for each of a first candidate set and a second candidate set.

Moreover, the carrier floating-point ambiguities may comprise a first float solution and a second float solution, and the ambiguity determining means may apply integer least squares and a validation process to each of the first float solution and the second float solution.

Moreover, the carrier floating-point ambiguities may comprise a first float solution and a second float solution, and the ambiguity determining means may perform an integer aperture bootstrapping process to each of the first float solution and the second float solution. See P. Teunissen, Integer aperture bootstrapping: a new GNSS ambiguity estimator with controllable fail-rate, Journal of Geodesy, Springer, 25.07.2005, vol. 79, no. 6, pp. 389-397.

Moreover, the carrier floating-point ambiguities may comprise a first float solution and a second float solution, and the ambiguity determining means may perform integer rounding on each of the first float solution and the second float solution.

Moreover, the carrier floating-point ambiguities may comprise a first float solution and a second float solution, and the ambiguity determining means may apply integer least squares and a validation process to each of the first float solution and the second float solution.

Moreover, the ambiguity determining means may determine at least two integer ambiguity candidate sets with at least one confidence indicator for each of a first candidate set and a second candidate set, and compare at least one confidence indicator for the first candidate set with at least one confidence indicator for the second candidate set to determine whether to apply a receiver-type bias.

Moreover, the ambiguity determining means may apply no receiver-type bias if the comparison shows a first confidence indicator to be conclusively better than a second confidence indicator, and apply the at least one receiver-type bias if the comparison shows the second confidence indicator to be conclusively better than the first confidence indicator.

Moreover, the ambiguity determining means may apply no receiver-type bias if the comparison shows a first confidence indicator to differ from a second confidence indicator by less than a predetermined amount.

Moreover, the ambiguity determining means may apply no receiver-type bias if said at least one receiver-type bias is below a predetermined threshold.

Moreover, the apparatus may include means for determining a best candidate norm and a second-best candidate norm for each floating solution, and wherein the confidence indicators comprise one of: (i) ratio of the second-best candidate norm to the best candidate norm for each floating solution; (ii)

the best candidate norm and the second-best candidate norm for each floating solution; and (iii) the norm of the best candidates.

The confidence indicators may comprise the Teunissen bootstrap integer aperture parameter.

Moreover, the ambiguity determining means may obtain further data sets if comparing at least one confidence indicator for the first candidate set with at least one confidence indicator for the second candidate set is inconclusive as to whether to apply a receiver-type bias.

Moreover, the ambiguity determining means may determine carrier integer ambiguities for at least one non-FDMA GNSS while not determining integer ambiguities for at least one FDMA GNSS.

Moreover, the carrier floating-point ambiguities may comprise bias-corrected floating-point ambiguities and the carrier integer ambiguities may comprise bias-corrected integer ambiguities, and the processing means may process the data sets without applying the receiver-type bias to estimate uncorrected floating-point ambiguities; determine uncorrected integer ambiguities from the uncorrected floating-point ambiguities; determine a first validation criterion for the uncorrected integer ambiguities; determine a second validation criterion for the bias-corrected integer ambiguities; and compare the first validation criterion with the second validation criterion to determine which of the uncorrected integer ambiguities and the corrected integer ambiguities is more likely valid.

Moreover, the bias determining means may periodically re-determine said at least one receiver-type bias and compare with a previously-determined receiver-type bias to determine whether to re-initialize the carrier integer ambiguities.

Moreover, the bias determining means may periodically determine whether to apply said at least one receiver-type bias, and re-initialize the carrier integer ambiguities when a determination of whether to apply said at least one receiver-type bias has changed.

Moreover, the apparatus may be configured to process the data sets sequentially in real-time as the data sets are acquired by at least one GNSS receiver.

Moreover, the apparatus may be configured to post-process the data sets as a complete set of previously-collected data.

Comparison of Receiver Types

Figure 14B:
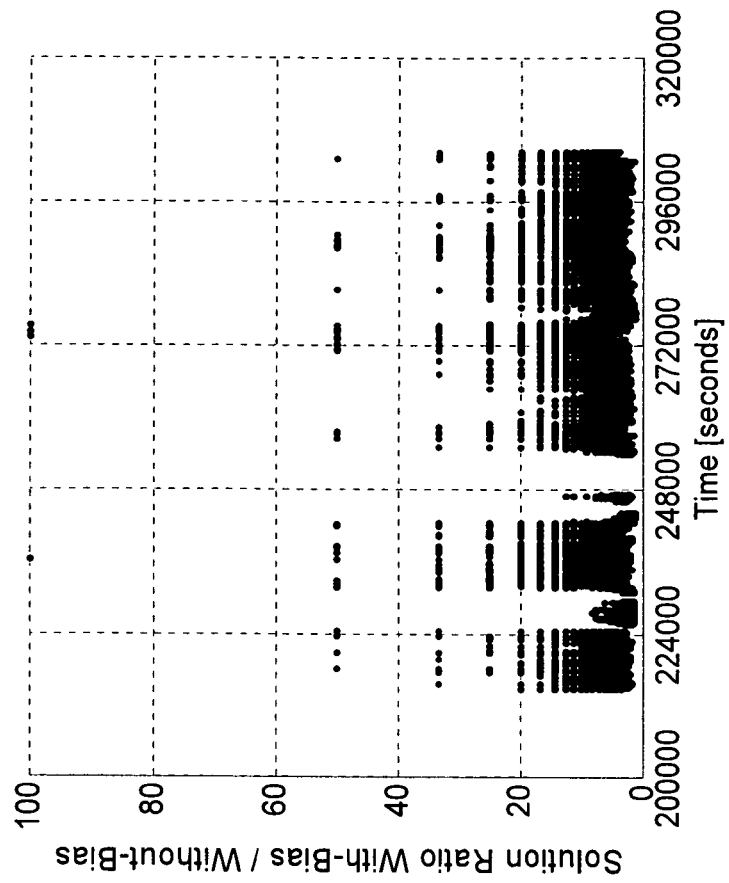
FIG. 14B shows search ratios obtained with GLONASS receiver hardware biases applied to the solution divided by the search ratios without the GLONASS receiver hardware biases applied for the case of FIG. 14A.
Figure 14A:
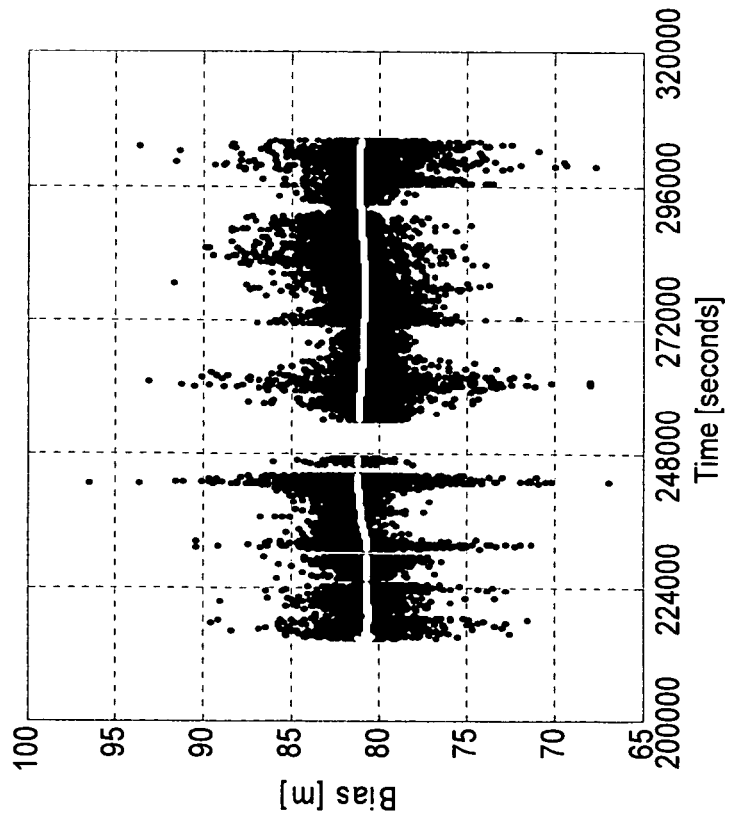
FIG. 14A illustrates GLONASS receiver hardware code minus carrier bias terms estimated between a Type3 receiver and Type1 receiver.

FIGS. 14A, 14B, 15A, 15B, 16A and 16B show the result of operation with various combinations of receiver types. FIG. 14A shows the estimated code bias over time between data from a receiver of a first type and a data from a receiver of a third type. The bias values are shown in black and averaged values are shown in white. The average estimated code bias is stable around 81 m. FIG. 14B shows a ratio over time between search ratios with bias applied divided by search ratios without bias applied for the example of FIG. 14A, indicating a substantial difference over time. Refer to the discussion above for a description of the search ratio.

Figures 15A, 15B:
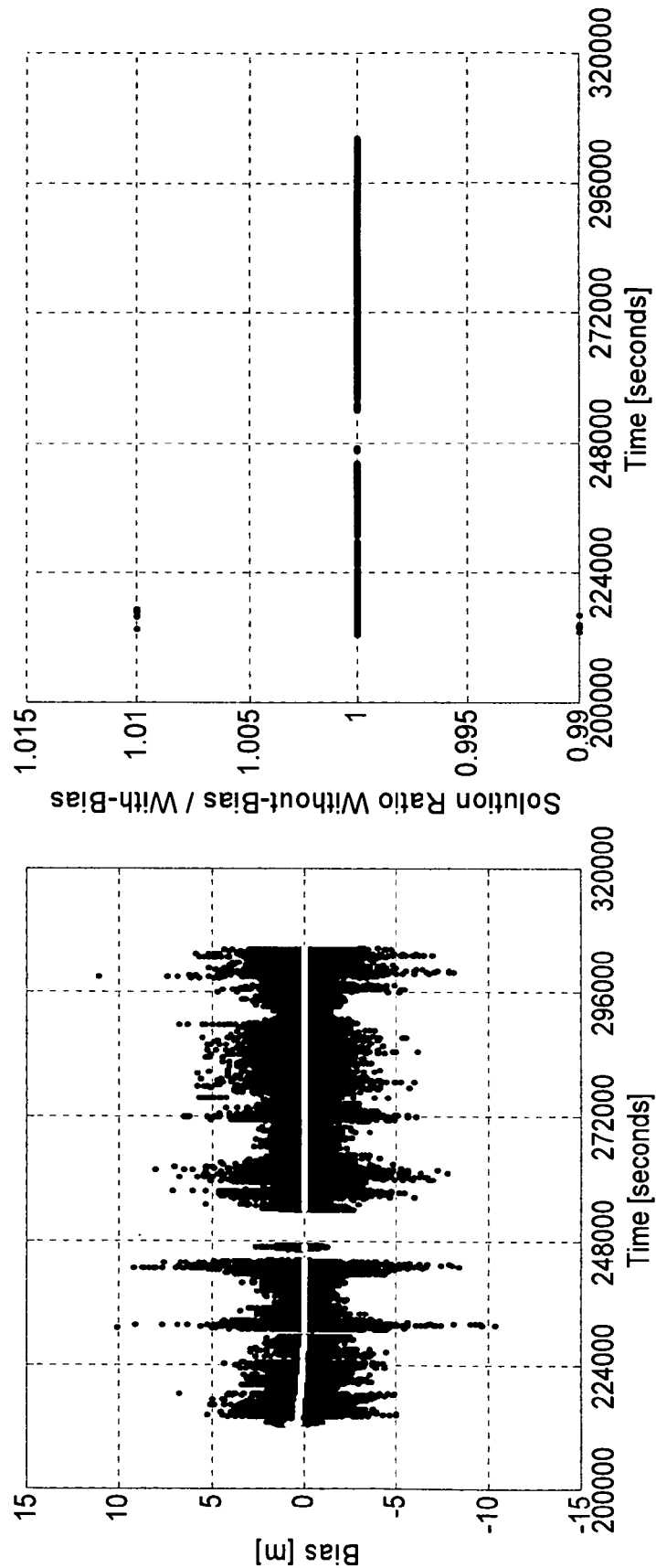
FIG. 15A illustrates GLONASS receiver hardware code minus carrier bias terms estimated between a Type1 receiver and Type1 receiver.
FIG. 15B shows the search ratios obtained without GLONASS receiver hardware biases applied to the solution divided by the search ratios with the GLONASS receiver hardware biases applied for the case of FIG. 15A.

FIG. 15A shows the estimated code bias over time between data from two receivers of the first type. The bias values are shown in black and averaged values are shown in white. The average estimated code bias is stable around 0 m. FIG. 15B shows a ratio over time between search ratios without bias applied divided by search ratios with bias applied for the example of FIG. 15A, indicating no difference.

Figure 16B:
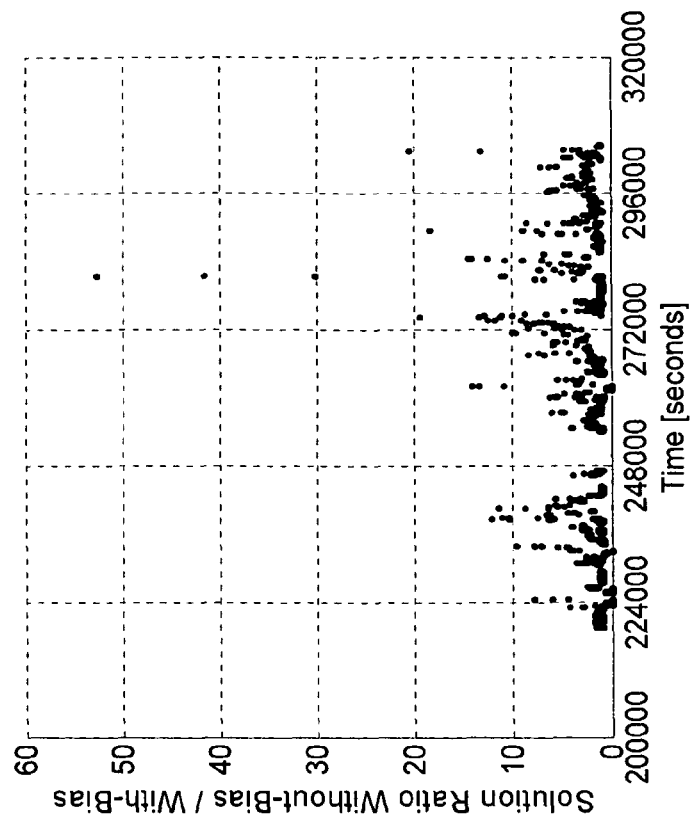
FIG. 16B shows the search ratios obtained without GLONASS receiver hardware biases applied to the solution divided by the search ratios with the GLONASS receiver hardware biases applied for the case of FIG. 16A.
Figure 16A:
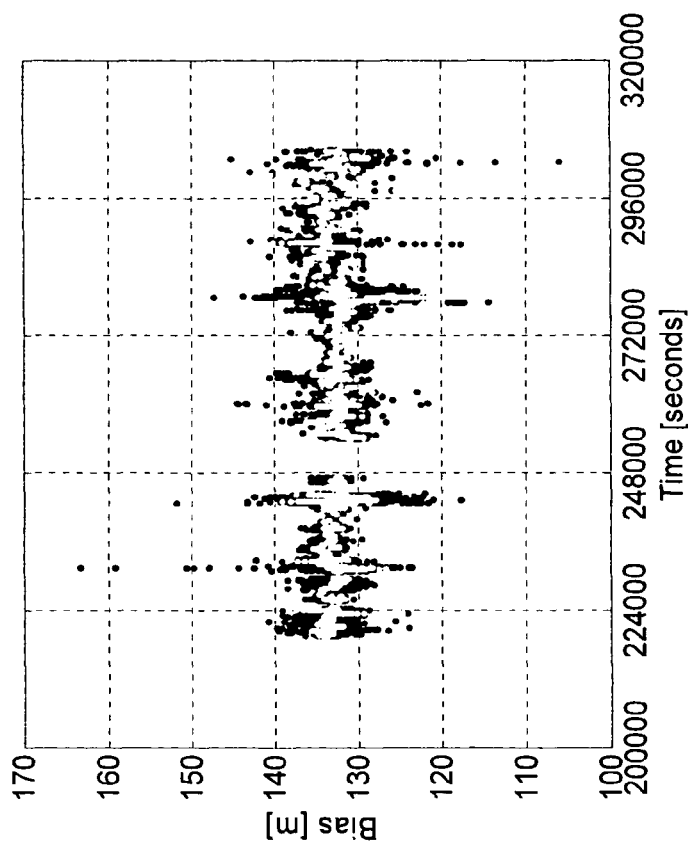
FIG. 16A illustrates GLONASS receiver hardware code minus carrier bias terms estimated between a Type2 receiver and Type1 receiver.

FIG. 16A shows the estimated code bias over time between data from a receiver of a first type and a data from a receiver of a second type. The bias values are shown in black and averaged values are shown in white. The average estimated code bias varies within a narrow range around 130 m. FIG. 16B shows a ratio over time between search ratios without bias applied divided by search ratios with bias applied for the example of FIG. 16A, indicating a substantial difference.

For operation with two receivers of a first type (same manufacturer), the code/carrier-biases are identical (FIG. 15A). For the case of operation with receivers of a first type and a second type (different manufactuers), the code-bias appears to be about 130 m (FIG. 16A), while the carrier-bias has been found to be equal to the code-bias. This means that GLONASS data from receivers of the first type and the second type are compatible from a reference ambiguity determination standpoint. That is, when second type and first type receivers are mixed, the single difference GLONASS receiver hardware code and carrier biases are both 130 m and therefore they cancel when subtracted from one another in (10) above.

Operation with receivers of a first type and a third type (different manufacturers) is more problematic. The code- and carrier-hardware biases that exist between these receivers appear to be different. This means that single-difference reference ambiguities determined from code-carrier filtering (10) of data from these receivers will contain a large bias. FIG. 16A illustrates the code bias for the data from these receivers. The GLONASS carrier bias is compatible with the GPS code bias in the case where observations from receivers of the first type and third type are used, while the GLONASS carrier bias is compatible with the GLONASS code bias where observations from receivers of the first type and second type are used.

Determining the GLONASS Code/Carrier Biases

Although the RTCM standard includes messages that standardize communication of GLONASS data for RTK positioning, no requirement is made with respect to the compatibility of GLONASS code and carrier observations between receivers of different manufacturers. Ideally the RTCM standard should include a requirement for all manufacturers to calibrate out code and carrier biases for GLONASS data. As can be seen from the data of FIG. 14A, if the first type were to be selected as the standard, then a correction of ~81 m would have to be applied to GLONASS code observations from receivers of the third type.

An intermediate solution to the GLONASS interoperability problem is to have all RTCM reference stations broadcast information about the receiver and antenna types. A recently published RTCM standard message format (RTCM 10403.1—Amendment 2) includes data fields for:

i. Reference Station ID
ii. Antenna Descriptor
iii. Antenna Serial Number
iv. Receiver Type Descriptor
v. Receiver Firmware Version
vi. Receiver Serial Number Rover equipment provided with this information can determine and apply corrections to observables from a particular manufacturer as needed to assure compatibility. But many manufacturers may not implement the newest message types of the Amendment 2. Many anonymous reference stations still exist in the user community.

Fortunately, reference-station receivers of the first type and second type normally operate using the Trimble CMR message format. Hence rover equipment is able to infer whether a compatible reference receiver is being used simply by noting that data is being received via the CMR format. Receivers of the third type until recently did not use the Trimble CMR format to transmit GLONASS data; legacy receivers of the third type may not be updated with the capability to use the Trimble CMR format.

When the type of reference station is known, the appropriate biases can be applied to its GLONASS data. For reference receivers of the third type used with rovers of the first type, this means applying ~81 m to ambiguities obtained via carrier-smoothed code. For reference receivers of the first type and second type, no bias is applied to the data.

According to another embodiment an apparatus for processing data collected by at least two receivers from multiple satellites of multiple GNSS where at least one GNSS is FDMA has the below configuration.

1) An apparatus for processing data collected by at least two receivers from multiple satellites of multiple GNSS where at least one GNSS is FDMA, comprising:
  a. Receiving means for obtaining data sets comprising a first data set from a first receiver and a second data set from a second receiver, wherein the first data set comprises a first FDMA data set and the second data set comprises a second FDMA data set, wherein at least one of a code bias and a phase bias may exist between the first FDMA data set and the second FDMA data set,
  b. Bias determining means for determining at least one receiver-type bias to be applied when the data sets are obtained from receivers of different types,
  c. Processing means for processing the data sets, based on the at least one receiver-type bias, to estimate carrier floating-point ambiguities, and
  d. Ambiguity determining means for determining carrier integer ambiguities from the floating-point ambiguities.

2) The apparatus of 1), wherein the bias determining means is configured to determine a receiver type by considering at least one of: receiver manufacturer, receiver model, receiver firmware version, receiver serial number, antenna manufacturer, antenna model, and antenna serial number. (e.g., RTCM 3.1 receiver-type message)

3) The apparatus of one of 1) and 2), wherein the bias determining means is configured to determine a receiver type by examining a message containing at least one of a receiver descriptor and an antenna descriptor. (e.g., RTCM 3.1 receiver-type message)

4) The apparatus of 3), wherein the bias determining means is configured to examine a data stream containing data collected by the receiver and at least one of a receiver descriptor and an antenna descriptor. (e.g., RTCM 3.1 receiver-type message in data stream)

5) The apparatus of 3), wherein the bias determining means is configured to examine at least one manually-input descriptor. (network setup by manual user input or selection of receiver type)

6) The apparatus of 3), wherein the bias determining means is configured examine a table containing receiver identification data by one of station number and receiver location. (e.g., IGS via internet)

7) The apparatus of 3), wherein the bias determining means is configured to query a source having receiver type information. (e.g., IGS via internet)

8) The apparatus of 3), wherein the bias determining means is configured to deduce the receiver type from characteristics of a data stream. (e.g., CMR format signifies Type 1 or Type 2 or Type 3 receiver with recent update, while non-CMR format signifies Type 3 receiver without recent update)

Determining Bias by Lookup Table

9) The apparatus of one of 1)-8), wherein the bias determining means is configured to look in a table for at least one of: a code bias and/or phase bias to be applied for the receiver.

10) The apparatus of one of 1)-8), wherein the bias determining means is configured to consult a table for an indication of whether a bias is to be applied to code and whether a bias is to be applied to phase.

Determining Bias by Calculation—Part 1

11) The apparatus of one of 1)-8), wherein the bias determining means is configured to calculate at least one of a code bias and a phase bias from at least one clock bias term of a geometry filter.

12) The apparatus of one of 1)-8), wherein the bias determining means is configured to calculate at least one of a code bias and a phase bias from a difference between clock bias terms of single-receiver navigation solutions for a reference receiver and a rover receiver.

13) The apparatus of one of 1)-8), wherein the bias determining means is configured to calculate at least one of a code bias and a phase bias from a clock bias term of a differential GNSS solution.

14) The apparatus of one of 1)-8), wherein the bias determining means is configured to calculate a code bias by combining at least two of: a code bias determined from at least one clock bias term of a geometry filter, a code bias determined from a difference between clock bias terms of single-receiver navigation solutions for a reference receiver and a rover receiver, and a code bias determined from a clock bias term of a differential GNSS solution.

15) The apparatus of one of 1-8), wherein the bias determining means is configured to calculate a phase bias by combining at least two of: a phase bias determined from at least one clock bias term of a geometry filter, a phase bias determined from a difference between clock bias terms of single-receiver navigation solutions for a reference receiver and a rover receiver, and a phase bias determined from a clock bias term of a differential GNSS solution.

Applying the Bias

16) The apparatus of one of 1)-15), wherein the processing means is configured to combine a bias value with the FDMA data set from the first receiver.

17) The apparatus of one of 1)-15), wherein the processing means is configured to combine the bias value with a portion of the FDMA data set from the first receiver representing code measurements of an FDMA GNSS.

18) The apparatus of one of 1)-15), wherein the FDMA GNSS comprises multiple satellites each transmitting a signal having a particular carrier wavelength, and wherein the processing means is configured to process the FDMA data set based on the at least one receiver-type bias by combining a bias value with a portion of the FDMA data set from the first receiver representing phase measurements of a given satellite of the FDMA GNSS, wherein the bias value is divided by the carrier wavelength of signal from the given satellite. (for Type 3)

RTK, Network, PP

19) The apparatus of one of 1)-18), including a rover receiver and a reference receiver, and wherein the processing means is configured to estimate differential carrier floating-point ambiguities, further comprising applying the carrier integer ambiguities to determine a rover position.

20) The apparatus of one of 1)-18), wherein the receivers are reference receivers of a reference station network, further configured to apply the carrier ambiguities to produce network correction data.

21) The apparatus of one of 1)-18), wherein the data sets comprise data previously collected by the receivers and stored for post-processing, and wherein the processing means is configured to retrieve the data sets from storage for post-processing.

When Bias is Applied

22) The apparatus of one of 1)-21), wherein the processing means is configured to first apply the at least one receiver-type bias to the FDMA data from the first receiver to produce corrected data sets and to subsequently process the corrected data sets to obtain the carrier floating-point ambiguities.

23) The apparatus of one of 1)-21), wherein the processing means is configured to process the data sets to obtain an intermediate data set [float solution or a step leading to a float solution], and applying the at least one receiver-type bias to the intermediate data set to obtain a corrected intermediate data set.

24) The apparatus of 23), wherein the processing means is configured to further process the corrected intermediate data set to estimate the carrier floating-point ambiguities.

25) The apparatus of 23), wherein the intermediate data set comprises bias-corrected floating-point ambiguities, and wherein the ambiguity determining means is configured to determine carrier integer ambiguities from the bias-corrected floating-point ambiguities.

Determining Bias by Calculation—Part 2

26) The apparatus of one of 1)-25), wherein the processing means is configured to first estimate carrier ambiguities (non-integer or integer) without applying the at least one receiver-type bias and to then correct the carrier ambiguities by applying the at least one receiver-type bias to obtain the carrier floating-point ambiguities.

27) The apparatus of one of 1)-25), wherein the processing means is configured to estimate the floating-point ambiguities and then applying the at least one receiver-type bias to the float solution ambiguities.

28) The apparatus of one of 1)-27), wherein the ambiguity determining means is configured determine at least two integer ambiguity candidate sets with at least one confidence indicator for each of a first candidate set and a second candidate set.

29) The apparatus of one of 1)-28), wherein the carrier floating-point ambiguities comprise a first float solution and a second float solution, and wherein the ambiguity determining means is configured to apply integer least squares and a validation process to each of the first float solution and the second float solution.

30) The apparatus of one of 1)-28), wherein the carrier floating-point ambiguities comprise a first float solution and a second float solution, and wherein the ambiguity determining means is configured to perform an integer aperture bootstrapping process to each of the first float solution and the second float solution.

31) The apparatus of one of 1)-28), wherein the carrier floating-point ambiguities comprise a first float solution and a second float solution, and wherein the ambiguity determining means is configured to perform integer rounding on each of the first float solution and the second float solution.

32) The apparatus of one of 1)-28), wherein the carrier floating-point ambiguities comprise a first float solution and a second float solution, and wherein the ambiguity determining means is configured to apply integer least squares and a validation process to each of the first float solution and the second float solution.

33) The apparatus of one of 1-27), wherein the ambiguity determining means is configured to determine at least two integer ambiguity candidate sets with at least one confidence indicator for each of a first candidate set and a second candidate set, and to compare at least one confidence indicator for the first candidate set with at least one confidence indicator for the second candidate set to determine whether to apply a receiver-type bias.

34) The apparatus of 33), wherein the ambiguity determining means is configured to apply no receiver-type bias if the comparison shows a first confidence indicator to be conclusively better than a second confidence indicator, and to apply the at least one receiver-type bias if the comparison shows the second confidence indicator to be conclusively better than the first confidence indicator.

35) The apparatus of 34), wherein the ambiguity determining means is configured to apply no receiver-type bias if the comparison shows a first confidence indicator to differ from a second confidence indicator by less than a predetermined amount.

36) The apparatus of one of 1-35), wherein the ambiguity determining means is configured to apply no receiver-type bias if said at least one receiver-type bias is below a predetermined threshold.

37) The apparatus of 33), further comprising: means for determining a best candidate norm and a second-best candidate norm for each floating solution, and wherein the confidence indicators comprise one of: (i) ratio of the second-best candidate norm to the best candidate norm for each floating solution; (ii) the best candidate norm and the second-best candidate norm for each floating solution; and (iii) the norm of the best candidates.

38) The apparatus of 33), wherein the confidence indicators comprise the Teunissen bootstrap integer aperture parameter.

39) The apparatus of 33), wherein the ambiguity determining means is configured to obtain further data sets if comparing at least one confidence indicator for the first candidate set with at least one confidence indicator for the second candidate set is inconclusive as to whether to apply a receiver-type bias.

40) The apparatus of 33), wherein the ambiguity determining means is configured to determine carrier integer ambiguities for at least one non-FDMA GNSS while not determining integer ambiguities for at least one FDMA GNSS.

41) The apparatus of one of 1)-40), wherein the carrier floating-point ambiguities comprise bias-corrected floating-point ambiguities and wherein the carrier integer ambiguities comprise bias-corrected integer ambiguities, and wherein the processing means is configured to process the data sets without applying the receiver-type bias to estimate uncorrected floating-point ambiguities; determine uncorrected integer ambiguities from the uncorrected floating-point ambiguities; determine a first validation criterion for the uncorrected integer ambiguities; determine a second validation criterion for the bias-corrected integer ambiguities; and compare the first validation criterion with the second validation criterion to determine which of the uncorrected integer ambiguities and the corrected integer ambiguities is more likely valid.

42) The apparatus of one of 1)-41), wherein the bias determining means is configured to periodically re-determine said at least one receiver-type bias and compare with a previously-determined receiver-type bias to determine whether to re-initialize the carrier integer ambiguities.

43) The apparatus of one of 1)-42), wherein the bias determining means is configured to periodically determine whether to apply said at least one receiver-type bias, and re-initialize the carrier integer ambiguities when a determination of whether to apply said at least one receiver-type bias has changed.

44) The apparatus of one of 1)-43), wherein the data sets are processed sequentially in real-time as the data sets are acquired by at least one GNSS receiver.

45) The apparatus of one of 1)-43), wherein the data sets are post-processed as a complete set of previously-collected data.

The invention claimed is:

1. A method of operating an apparatus comprising a processor and a storage element with instructions that enable the processor to process data collected by at least two receivers from multiple satellites of multiple Global Navigation Satellite Systems (GNSS) where at least one GNSS is Frequency Division Multiple Access (FDMA), comprising:
   a. obtaining data sets comprising a first data set from a first receiver and a second data set from a second receiver, wherein the first data set comprises a first FDMA data set and the second data set comprises a second FDMA data set, wherein at least one of a code bias and a phase bias may exist between the first FDMA data set and the second FDMA data set,
   b. determining at least one receiver-type bias to be applied when the data sets are obtained from receivers of different types,
   c. processing the data sets, based on the at least one receiver-type bias, to estimate sets of carrier floating-point ambiguities, and
   d. determining carrier integer ambiguities from the carrier floating-point ambiguities, comprising determining at least two integer ambiguity candidate sets with at least one confidence indicator for each of a first candidate set and a second candidate set, and at least one of (i) comparing at least one confidence indicator for the first candidate set with at least one confidence indicator for the second candidate set to determine whether to apply a receiver-type bias; (ii) applying no receiver-type bias if the comparison shows a first confidence indicator to be conclusively better than a second confidence indicator, applying the at least one receiver-type bias if the comparison shows the second confidence indicator to be conclusively better than the first confidence indicator; (iii) applying no receiver-type bias if the comparison shows a first confidence indicator to differ from a second confidence indicator by less than a predetermined amount; and (iv) applying no receiver-type bias if said at least one receiver-type bias is below a predetermined threshold.

2. The method of claim 1, wherein determining at least one receiver-type bias comprises one of: (i) determining a receiver type by considering at least one of: receiver manufacturer, receiver model, receiver firmware version, receiver serial number, antenna manufacturer, antenna model, and antenna serial number; and (ii) determining a receiver type by examining a message containing at least one of a receiver descriptor and an antenna descriptor; (iii) looking in a table for at least one of: a code bias and/or phase bias to be applied for the receiver; (iv) consulting a table for an indication of whether a bias is to be applied to code and whether a bias is to be applied to phase.

3. The method of claim 2, wherein determining the receiver type comprises one of: (i) examining a data stream containing data collected by the receiver and at least one of a receiver descriptor and an antenna descriptor; (ii) examining at least one manually-input descriptor; (iii) examining a table containing receiver identification data by one of station number and receiver location; (iv) querying a source having receiver type information; and (v) deducing the receiver type from characteristics of a data stream.

4. The method of claim 1, wherein determining at least one receiver-type bias comprises one of: (i) calculating at least one of a code bias and a phase bias from at least one clock bias term of a geometry filter; (ii) calculating at least one of a code bias and a phase bias from a difference between clock bias terms of single-receiver navigation solutions for a reference receiver and a rover receiver; and
   (iii) calculating at least one of a code bias and a phase bias from a clock bias term of a differential GNSS solution; (iv) calculating a code bias by combining at least two of: a code bias determined from at least one clock bias term of a geometry filter, a code bias determined from a difference between clock bias terms of single-receiver navigation solutions for a reference receiver and a rover receiver, and a code bias determined from a clock bias term of a differential GNSS solution; and (v) calculating a phase bias by combining at least two of: a phase bias determined from at least one clock bias term of a geometry filter, a phase bias determined from a difference between clock bias terms of single-receiver navigation solutions for a reference receiver and a rover receiver, and a phase bias determined from a clock bias term of a differential GNSS solution.

5. The method of claim 1, wherein processing the data sets based on the at least one receiver-type bias comprises one of: (i) combining a bias value with the FDMA data set from the first receiver; and (ii) combining the bias value with a portion of the FDMA data set from the first receiver representing code measurements of an FDMA GNSS.

6. The method of claim 1, wherein processing the data sets based on the at least one receiver-type bias comprises one of: (i) first applying the at least one receiver-type bias to the FDMA data from the first receiver to produce corrected data sets and subsequently processing the corrected data sets to obtain the carrier floating-point ambiguities; (ii) processing the data sets to obtain an intermediate data set; and applying the at least one receiver-type bias to the intermediate data set to obtain a corrected intermediate data set.

7. The method of claim 1, wherein processing the data sets based on the at least one receiver-type bias comprises one of: (i) first estimating carrier ambiguities (non-integer or integer) without applying the at least one receiver-type bias and then correcting the carrier ambiguities by applying the at least one receiver-type bias to obtain the carrier floating-point ambiguities; and (ii) estimating the floating-point ambiguities and then applying the at least one receiver-type bias to the float solution ambiguities.

8. The method of claim 1, wherein determining carrier integer ambiguities from the floating-point ambiguities comprises determining at least two integer ambiguity candidate sets with at least one confidence indicator for each of a first candidate set and a second candidate set, wherein the carrier floating-point ambiguities comprise a first float solution and a second float solution, and wherein determining carrier integer ambiguities comprises one of: (i) applying integer least squares and a validation process to each of the first float solution and the second float solution; (ii) performing an integer aperture bootstrapping process to each of the first float solution and the second float solution; (iii) performing integer rounding on each of the first float solution and the second float solution; and (iv) applying integer least squares and a validation process to each of the first float solution and the second float solution.

9. The method of claim 1, further comprising one of: (i) determining a best candidate norm and a second-best candidate norm for each set of carrier floating-point ambiguities, wherein the confidence indicators comprise a ratio of the second-best candidate norm to the best candidate norm for each set of carrier floating-point ambiguities; (ii) determining a best candidate norm and a second-best candidate norm for each set of carrier floating-point ambiguities, and wherein the confidence indicators comprise the best candidate norm and the second-best candidate norm for each set of carrier floating-point ambiguities; and (iii) determining a best candidate norm and a second-best candidate norm for each set of carrier floating-point ambiguities, wherein the confidence indicators comprise the norm of the best candidates; and (iv) employing Teunissen bootstrap integer aperture parameter as a confidence indicator.

10. The method of claim 9, wherein the carrier floating-point ambiguities comprise bias-corrected floating-point ambiguities and wherein the carrier integer ambiguities comprise bias-corrected integer ambiguities, the method further comprising: processing the data sets without applying the receiver-type bias to estimate uncorrected floating-point ambiguities; determining uncorrected integer ambiguities from the uncorrected floating-point ambiguities; determining a first validation criterion for the uncorrected integer ambiguities; determining a second validation criterion for the bias-corrected integer ambiguities; and comparing the first validation criterion with the second validation criterion to determine which of the uncorrected integer ambiguities and the corrected integer ambiguities is more likely valid.

11. An apparatus comprising a processor and a storage element with instructions that, when loaded, enable the processor to process data collected by at least two receivers from multiple satellites of multiple Global Navigation Satellite Systems (GNSS) where at least one GNSS is Frequency Division Multiple Access (FDMA), by:
   a. obtaining data sets comprising a first data set from a first receiver and a second data set from a second receiver, wherein the first data set comprises a first FDMA data set and the second data set comprises a second FDMA data set, wherein at least one of a code bias and a phase bias may exist between the first FDMA data set and the second FDMA data set,
   b. determining at least one receiver-type bias to be applied when the data sets are obtained from receivers of different types,
   c. processing the data sets, based on the at least one receiver-type bias, to estimate carrier floating-point ambiguities, and
   d. determining carrier integer ambiguities from the carrier floating-point ambiguities, comprising determining at least two integer ambiguity candidate sets with at least one confidence indicator for each of a first candidate set and a second candidate set, and at least one of (i) comparing at least one confidence indicator for the first candidate set with at least one confidence indicator for the second candidate set to determine whether to apply a receiver-type bias; (ii) applying no receiver-type bias if the comparison shows a first confidence indicator to be conclusively better than a second confidence indicator, applying the at least one receiver-type bias if the comparison shows the second confidence indicator to be conclusively better than the first confidence indicator; (iii) applying no receiver-type bias if the comparison shows a first confidence indicator to differ from a second confidence indicator by less than a predetermined amount; and (iv) applying no receiver-type bias if said at least one receiver-type bias is below a predetermined threshold.

12. The apparatus of claim 11, wherein determining at least one receiver-type bias comprises one of: (1) determining a receiver type by considering at least one of: receiver manufacturer, receiver model, receiver firmware version, receiver serial number, antenna manufacturer, antenna model, and antenna serial number; (ii) determining a receiver type by examining a message containing at least one of a receiver descriptor and an antenna descriptor; (iii) looking in a table for at least one of a code bias and/or phase bias to be applied for the receiver; and (iv) consulting a table for an indication of whether a bias is to be applied to code and whether a bias is to be applied to phase.

13. The apparatus of claim 12, wherein determining the receiver type comprises one of: (i) examining a data stream containing data collected by the receiver and at least one of a receiver descriptor and an antenna descriptor; (ii) examining at least one manually-input descriptor; (iii) examining a table containing receiver identification data by one of station number and receiver location; (iv) querying a source having receiver type information; and (v) deducing the receiver type from characteristics of a data stream.

14. The apparatus of claim 11, wherein determining at least one receiver-type bias comprises one of: (i) calculating at least one of a code bias and a phase bias from at least one clock bias term of a geometry filter; (ii) calculating at least one of a code bias and a phase bias from a difference between clock bias terms of single-receiver navigation solutions for a reference receiver and a rover receiver; (iii) calculating at least one of a code bias and a phase bias from a clock bias term of a differential GNSS solution; (iv) calculating a code bias by combining at least two of: a code bias determined from at least one clock bias term of a geometry filter, a code bias determined from a difference between clock bias terms of single-receiver navigation solutions for a reference receiver and a rover receiver, and a code bias determined from a clock bias term of a differential GNSS solution; and (v) calculating a phase bias by combining at least two of: a phase bias determined from at least one clock bias term of a geometry filter, a phase bias determined from a difference between clock bias terms of single-receiver navigation solutions for a reference receiver and a rover receiver, and a phase bias determined from a clock bias term of a differential GNSS solution.

15. The apparatus of claim 11, wherein processing the data sets based on the at least one receiver-type bias comprises one of (i) combining a bias value with the FDMA data set from the first receiver; and (ii) combining a bias value with a portion of the FDMA data set from the first receiver representing code measurements of an FDMA GNSS.

16. The apparatus of claim 11, wherein processing the data sets based on the at least one receiver-type bias comprises one of: (1) first applying the at least one receiver-type bias to the FDMA data from the first receiver to produce corrected data sets and subsequently processing the corrected data sets to obtain the carrier floating-point ambiguities; and (ii) processing the data sets to obtain an intermediate data set, and applying the at least one receiver-type bias to the intermediate data set to obtain a corrected intermediate data set.

17. The apparatus of claim 11, wherein processing the data sets based on the at least one receiver-type bias comprises one of: (i) first estimating carrier ambiguities (non-integer or integer) without applying the at least one receiver-type bias and then corrected the carrier ambiguities by applying the at least one receiver-type bias to obtain the carrier floating-point ambiguities; and (ii) estimating the floating-point ambiguities and then applying the at least one receiver-type bias to the float solution ambiguities.

18. The apparatus of claim 11, wherein the carrier floating-point ambiguities comprise a first float solution and a second float solution, and wherein determining carrier integer ambiguities comprises one of: (i) applying integer least squares and a validation process to each of the first float solution and the second float solution; (ii) performing an integer aperture bootstrapping process to each of the first float solution and the second float solution; (iii) performing integer rounding on each of the first float solution and the second float solution; and (iv) applying integer least squares and a validation process to each of the first float solution and the second float solution.

19. The apparatus of claim 11, further comprising one of: (i) determining a best candidate norm and a second-best candidate norm for each set of carrier floating-point ambiguities, wherein the confidence indicators comprise a ratio of the second-best candidate norm to the best candidate norm for each set of carrier floating-point ambiguities; (ii) determining a best candidate norm and a second-best candidate norm for each set of carrier floating-point ambiguities, wherein the confidence indicators comprise the best candidate norm and the second-best candidate norm for each set of carrier floating-point ambiguities; (iii) determining a best candidate norm and a second-best candidate norm for each floating solution, wherein the confidence indicators comprise the norm of the best candidates; and (iv) employing Teunissen bootstrap integer aperture parameter as a confidence indicator.

20. The apparatus of claim 11, wherein the carrier floating-point ambiguities comprise bias-corrected floating-point ambiguities and wherein the carrier integer ambiguities comprise bias-corrected integer ambiguities, the apparatus further comprising: processing the data sets without applying the receiver-type bias to estimate uncorrected floating-point ambiguities; determining uncorrected integer ambiguities from the uncorrected floating-point ambiguities; determining a first validation criterion for the uncorrected integer ambiguities; determining a second validation criterion for the bias-corrected integer ambiguities; and comparing the first validation criterion with the second validation criterion to determine which of the uncorrected integer ambiguities and the corrected integer ambiguities is more likely valid.

21. A computer-readable medium storing a computer program comprising instructions adapted to cause a processor, when loaded with the instructions, to carry out the method of claim 1.

* * * * *